United States Patent
Dangi et al.

(10) Patent No.: US 11,487,708 B1
(45) Date of Patent: Nov. 1, 2022

(54) INTERACTIVE VISUAL DATA PREPARATION SERVICE

(71) Applicant: Amazon Technologies, Inc., Seattle, WA (US)

(72) Inventors: Surbhi Dangi, Mountain View, CA (US); Gopinath Duddi, San Jose, CA (US); Amit Gul Phagwani, Fremont, CA (US); Romi Boimer, Newark, CA (US); Ronald Stephen Kyker, Foster City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/095,360

(22) Filed: Nov. 11, 2020

(51) Int. Cl.
*G06F 16/14* (2019.01)
*G06F 16/248* (2019.01)
*G06F 17/14* (2006.01)

(52) U.S. Cl.
CPC ......... *G06F 16/156* (2019.01); *G06F 16/248* (2019.01); *G06F 17/14* (2013.01)

(58) Field of Classification Search
None
See application file for complete search history.

(56) References Cited

U.S. PATENT DOCUMENTS

| | | | | |
|---|---|---|---|---|
| 10,437,847 | B1* | 10/2019 | Silberstein | G06F 16/26 |
| 10,459,942 | B1* | 10/2019 | Silberstein | G06F 16/254 |
| 11,106,706 | B1* | 8/2021 | Bates | G06F 3/0485 |
| 2019/0147086 | A1* | 5/2019 | Pal | G06F 16/24535 |
| | | | | 707/718 |
| 2020/0356689 | A1* | 11/2020 | McEnroe | H04L 9/3239 |
| 2021/0326717 | A1* | 10/2021 | Mueller | G06Q 50/10 |
| 2021/0374134 | A1* | 12/2021 | He | G06F 16/24539 |
| 2022/0004577 | A1* | 1/2022 | Falco | G06F 16/9024 |

OTHER PUBLICATIONS

"Data Wrangling Software and Tools" printout of http://www.trifacta.com downloaded on Nov. 8, 2020, 7 pages.
"Accelerate Data Preparation on AWS," downloaded from https://www.trifacta.com/resource-library/accelerate-data-preparation-on-aws/, 3 pages.
"Advanced Data Preparation for Individuals and Teams," downloaded from https://www.trifacta.com/resource-library/trifacta-wrangler-pro-datasheet/, 2 pages.
"Data Preparation for the Scale and Agility of Modern Business," downloaded from https://www.trifacta.com/resource-ibrary/trifacta-wrangler-enterprise-datasheet/, 2 pages.

* cited by examiner

*Primary Examiner* — Kim T Nguyen
(74) *Attorney, Agent, or Firm* — Nicholson DeVos Webster & Elliott LLP

(57) ABSTRACT

Techniques for visual data preparation are described. An interactive visual data preparation service provides a user with a graphical user interface that presents values from a sample taken of a dataset along with statistical information associated with those values. A user uses the graphical user interface to test out various transformations to the sample dataset by applying transformations and viewing near-immediate results of those transformations as applied to the sample. The desired set of transformations is represented as a recipe object, which can be used to perform data preparation against the overall dataset or other datasets on behalf of the user or other users.

20 Claims, 25 Drawing Sheets

CREATE PROJECT

▼ PROJECT DETAILS

PROJECT NAME
*NEW-PROJECT1* ⌐205

ATTACHED RECIPE         RECIPE NAME
CREATE NEW ▶            *NEW-PROJECT-RECIPE* ⌐215
☐ IMPORT STEPS FROM RECIPE

⌐210

▼ SELECT A DATASET

| MY DATASETS | | SAMPLE FILES | IMPORT NEW DATASET ⌐220 |

🔍

| DATASET NAME | TYPE | SOURCE | CREATE DATE | CREATED BY |
|---|---|---|---|---|
| PLAYERS-DATA | PARQUET | OBJECTSTORE | 8 DAYS AGO | JOHN-SMITH |
| INVOICES-MAY | CSV | OBJECTSTORE | 9 DAYS AGO | ADITYA-KUMAR |
| TRADE-Q1 | XLSX | OBJECTSTORE | 16 DAYS AGO | JOHN-SMITH |

⦿⦾⦾  •••

< 1 2 3 >  ⌐225

▲ SAMPLING - *OPTIONAL*

▲ TAGS - *OPTIONAL*

( CANCEL ⌐230 )   ( CREATE PROJECT ⌐235 ) ⌐240

DATASETS
PROJECTS
RECIPES
JOBS

JOBS > CREATE JOB

CREATE RECIPE JOB

DATASETS

PROJECTS

RECIPES

JOBS

▼ JOB DETAILS

JOB NAME
[ NEW-JOB1 ]

▼ JOB TYPE

ASSOCIATED DATASET:                    ASSOCIATED RECIPE:
INVOICES-MAY                           NEW-PROJECT1-RECIPE
STORAGESERVICE://OURDATA/INCOMING/INV.CSV   WORKING VERSION

▼ JOB OUTPUT SETTINGS

FILE TYPE        STORAGE SERVICE LOCATION              COMPRESSION

[ CSV ▶ ]        [ STORAGESERVICE://OUTDATA/ANALYSIS/ ] ( BROWSE )    [ NONE ▶ ]

ENCRYPTION ☑

( ADD ANOTHER OUTPUT )

▲ ADDITIONAL CONFIGURATION - *OPTIONAL*

▲ ADVANCED JOB SETTINGS - *OPTIONAL*

▲ SCHEDULE JOBS - *OPTIONAL*

▲ TAGS - *OPTIONAL*

( CANCEL )    ( CREATE AND RUN JOB )

*FIG. 18*

| JOBS > NEW-JOB1 | | | | |
|---|---|---|---|---|
| NEW-JOB1 | | | | |
| JOB RUN HISTORY | JOB DETAILS | DATA LINEAGE | | |
| JOB RUN HISTORY | | | | |
| *JOB RUN ID* | *STATUS* | *RUN TIME* | *OUTPUT* | *SUMMARY* | *STARTED BY* |
| NEW-JOB_2020-06-30 14:11:15 | SUCCEEDED | 1 MIN 57 SECS | 1 OUTPUT | | JOHN-SMITH |

DATASETS
PROJECTS
RECIPES
JOBS

*FIG. 19*

INTERACTIVE VISUAL DATA PREPARATION SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Further, the amount of data generated by users and systems in modern organizations has exploded, leading to a significant problem regarding how to find, understand, and use this data. This problem is especially challenging when non-technical users wish to find and use data, as well as when the data being generated (and provided to other users) changes over time, potentially unbeknownst to users relying upon that data, or is generated by different systems in different locations, formats, etc.

BRIEF DESCRIPTION OF DRAWINGS

Various embodiments in accordance with the present disclosure will be described with reference to the drawings, in which:

FIG. 2 is a diagram illustrating an exemplary user interface provided by an interactive visual data preparation service for creating a data preparation project according to some embodiments.

FIG. 6 is a diagram illustrating an exemplary user interface including an information panel provided by an interactive visual data preparation service for viewing columnar transformation recommendations according to some embodiments.

FIG. 11 is a diagram illustrating an exemplary user interface showing proposed new columns created by a user-selected split transformation according to some embodiments.

FIG. 15 is a diagram illustrating an exemplary user interface showing a proposed new column created by a user-selected mapping transformation according to some embodiments.

FIG. 16 is a diagram illustrating an exemplary user interface showing the updated sample dataset resulting from a user-selected mapping transformation and an updated recipe with seven recipe steps according to some embodiments.

FIG. 18 is a diagram illustrating an exemplary user interface provided by an interactive visual data preparation service for data preparation job creation based on recipes according to some embodiments.

FIG. 19 is a diagram illustrating an exemplary user interface provided by an interactive visual data preparation service for view job run history according to some embodiments.

DETAILED DESCRIPTION

Figure 1:
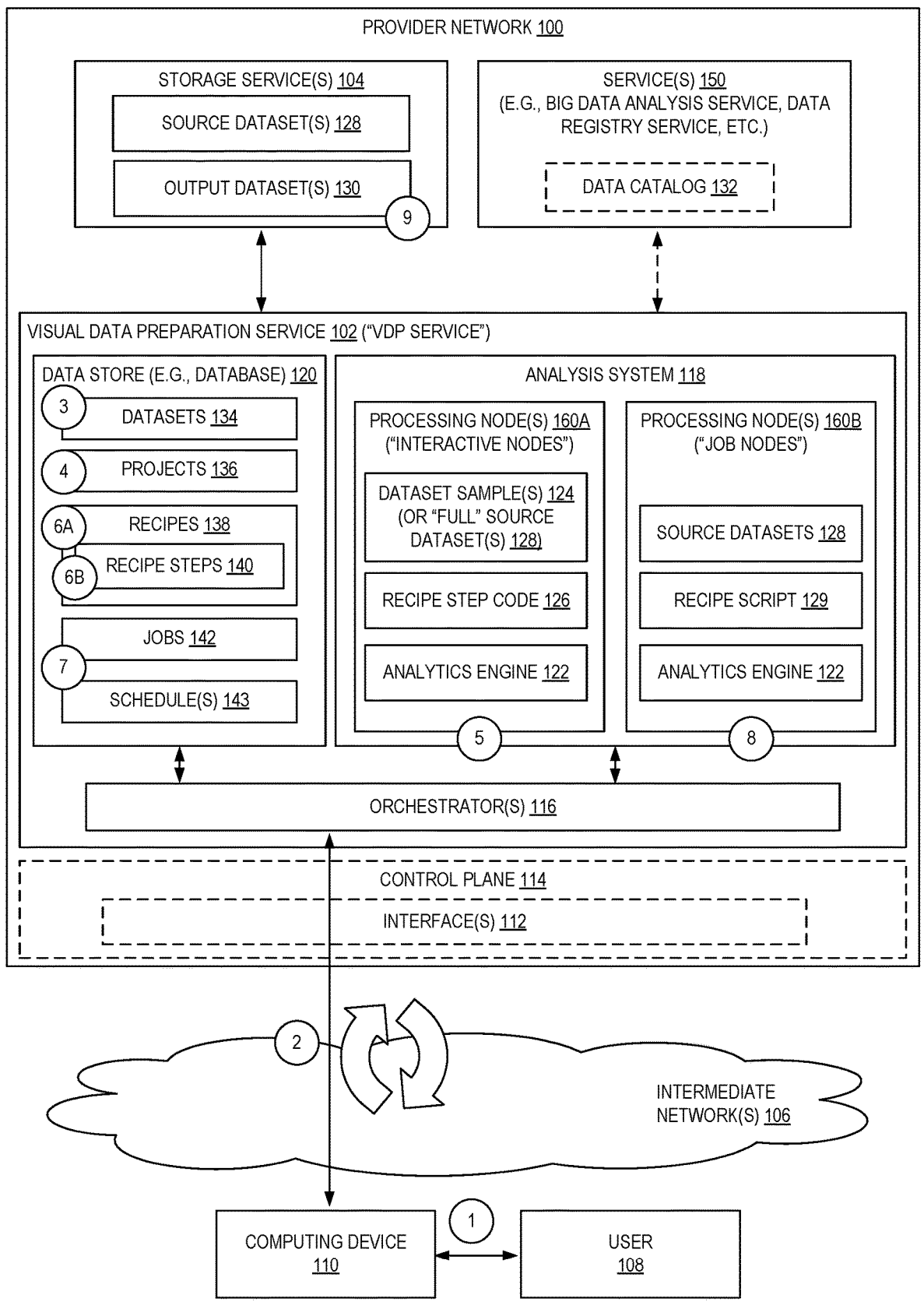
FIG. 1 is a diagram illustrating an environment for simplified data preparation using an interactive visual data preparation service according to some embodiments.

The present disclosure relates to methods, apparatus, systems, and non-transitory computer-readable storage media for simplified data preparation using an interactive visual data preparation ("VDP") service. According to some embodiments disclosed herein, a VDP service is a cloud-scale data preparation service that helps users explore, transform, and enrich potentially terabytes (or more) of raw data for analytics and machine learning without having to manage any infrastructure. The VDP service, in some embodiments, allows users to easily connect to their data and utilize an intuitive user interface to interactively discover, visualize, clean, and transform the raw data into more usable forms by creating a transformation recipe that can be applied to a dataset. The user interface may near-instantaneously provide the results of the user's proposed transformations to the user to allow for rapid iterative exploration and reconfiguration. In some embodiments, the VDP service does not require users to write code and may thus democratize access to various data sources to many different types or amounts of data workers. The VDP service, in some embodiments, is "serverless" and thus removes the need for users to manage computing resource infrastructure on their own such as servers, applications, networking, security, etc.

In some embodiments, a VDP service provides a user interface allowing users to select a source dataset—whether stored at a storage location or uploaded as one or more files—and visually clean, prepare, and transform a sample of the data without writing code. Via this user interface, the user may create a recipe of transformations (or, "recipe steps") that can be used to run a transformation job against the full source dataset or another dataset to yield output data that can be exported to a storage location, provided to another service or system, etc. Accordingly, in some embodiments, the VDP service can simplify data preparation tasks by allowing users to identify and rectify data-related issues that are traditionally hard to spot and time consuming to clean, allowing users of all technical levels to visualize the data and easily perform data transformations with little to no coding required.

With the significant increase in the amount of data generated by and flowing through modern organizations, a strong need has been created to be able to not only collect this data but perhaps more importantly to be able to organize and understand the data, allowing for action based on insights obtained from the data. However, the amount of data is often extremely large, and the data itself is often full of inconsistencies, inaccuracies, and errors, may be difficult to understand, and may be in many different types of systems, formats, and/or locations.

In response, many larger organizations employ large numbers of data analysts and/or data scientists to organize and clean the data, and then attempt to gain insights from the data, generate reports based on the data, etc. However, to work with such large data sets, these individuals must learn how to write sophisticated programming code (e.g., for an analytics package such as the Apache Spark unified analytics engine for big data processing) and/or work with teams of software engineers, database administrators, or other technical workers to be able implement these efforts, e.g., to set up an ETL (extract, transform and load) data integration process to obtain, clean, and combine data from various data sources (such as transactional systems) into a single, consistent data store (e.g., a database system, data lake, data warehouse), and/or to utilize analysis systems such as "big data" analytics systems, machine learning (ML) systems, and the like, in an attempt to comprehend and use the data. As a result, being able to implement these systems is incredibly difficult and time consuming, and the resulting systems are often inflexible to changes in the source data or changes of the needs of the users. Moreover, smaller organizations or groups of users may not even be able to even begin analyzing this data, as they may not have the knowledge, ability, time, or resources available to set up such data acquisition and preparation efforts.

Accordingly, embodiments disclosed herein provide a VDP service that provides a self-service tool to help various types of users—from expert to non-expert—easily access, prepare, clean, and normalize large data sets.

For example, with files in a data warehouse, data lake, or other storage location, a user may utilize the VDP service to see portions of the data itself, statistics based on the data, visualizations of the data, etc., allowing the user to spot issues or anomalies quickly, and quickly test out any one or more of many different types or combinations of transformations to the data to "clean" it for a particular desired use. In some embodiments, the VDP service orchestrates the exploration and experimentation of the use of these transformations of the data in an interactive, on-the-fly manner providing immediate user feedback via a dynamic user interface that shows the results of applying various transformation steps to a subset of the dataset. Thereafter, the ultimate recipe of transformations that the user creates can be applied against the entire source dataset as a "job" or to other datasets or modified/supplemented versions of the dataset at other points in time, optionally integrating with another system (e.g., an ETL pipeline, a machine learning pipeline, etc.) to serve as or support a data preparation function of a larger system.

FIG. 1 is a diagram illustrating an environment for simplified data preparation using an interactive visual data preparation service according to some embodiments. In FIG. 1, a VDP service 102 is executed as part of a service provider network 100 and may be implemented using software executed by one or multiple computing devices at one or multiple computing locations (e.g., in a distributed manner).

A cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Thus, in some embodiments, a provider network 100 (or, "cloud" provider network, service provider network, or the like) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service (e.g., storage service 104) that can store data objects, etc.

Users 108 (or "customers") of provider networks 100 may utilize one or more user accounts that are associated with a customer account, though these terms may be used somewhat interchangeably depending upon the context of use. Users 108 may interact with a provider network 100 (via use of a computing device 110) across one or more intermediate networks 106 (e.g., the internet) via one or more interface(s) 112, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 112 may be part of, or serve as a front-end to, a control plane 114 of the provider network 100 that includes "backend" services supporting and enabling the services that may be more directly offered to customers.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Thus, an on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code.

A hardware virtualization service 112 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A provider network 100 may also implement a container service that acts as a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, the VDP service 102 includes one or more orchestrators 116, an analysis system 118, and a data store 120, which may be implemented using software, hardware, or a combination of both. These components of the VDP service 102 may be deployed in one location, region, zone, etc., of the provider network 100 or in multiple locations, regions, zones, etc., of the provider network 100. By way of example, the one or more orchestrators 116 could be deployed as one or more serverless functions (executed by an on-demand code execution service described herein), the data store 120 could be implemented as one or more database servers (e.g., executed by a database service of the provider network) or object storage servers, and the analysis system 118 could utilize processing nodes 160A-160B comprising one or more compute instances (e.g., managed by a hardware virtualization service) running an analytics engine 122 (e.g., the Apache Spark™ data processing framework, Apache Hadoop, etc.).

The VDP service 102 may also utilize other separate services, e.g., one or more storage services 104 (e.g., a cloud object storage service such as Amazon Simple Storage Service (S3)) for obtaining source datasets 128 and/or storing output datasets 130, or one or more other services 150 for obtaining data or metadata (corresponding to a dataset, such as that stored in a data catalog 132 of a data registry service, and/or security/permissions data), executing jobs (e.g., via a "Big Data" analysis service, a hardware virtualization service, etc.), or the like.

In some embodiments, the user 108 utilizes a computing device 110 at circle (1) such as a personal computer, laptop, smartphone, tablet, etc., to interact with the VDP service 102 by sending requests to the VDP service 102—and receiving responses back therefrom—over one or more intermediate networks 106 such as the internet, as shown at circle (2). In some embodiments, for example, the VDP service 102 sends the computing device 110 data (e.g., web pages, scripts, images, semi-structured or structured data, etc.) for a "console" (or similar set of user interfaces) presented via a web browser, special-purpose application, or the like, that presents a visual interface to the user. In some embodiments, this network traffic may be sent by the computing device 110 to one or more web service endpoints associated with one or more orchestrator(s) 116.

The console may present a set of user interfaces to the user 108, via the computing device 110, to allow the user 108 to define or "register" one or more datasets 134 (that may already exist, e.g., within the storage service(s) 104 as source dataset(s) 128 at circle (3), that may exist in the future (e.g., by indirectly referencing them using a storage location identifier, wildcard, etc.), that may be uploaded as one or more files concurrently, and/or that may be referenced/described by a data catalog 132 of another service 150) that can be used within the service, and create one or more visual data preparation projects 136 at circle (4) for transforming ones of those datasets 134.

For example, upon creating a project 136, the orchestrator(s) 116 may cause a sample of the source dataset 128 corresponding to a registered dataset 134 to be loaded into one or more processing node(s) 160A as dataset sample 124 at circle (5). The sample may be a proper subset of the source dataset 128, such as a fixed number of rows of data from the source dataset 128, a percentage of rows of data from the source dataset 128, etc. Generally, whereas the source dataset 128 may include hundreds, thousands, tens of thousands, or millions (or more) of records (commonly organized in rows), the dataset sample 124 will include far fewer records, such as one hundred, five hundred, or the like. However, in some embodiments, the "sample" may actually include all records of the source dataset 128, such as when the source dataset 128 is less than a threshold size (e.g., has fewer than a defined amount of records, takes up less than a threshold amount of storage or memory, etc.).

The size of the sample 124 may be flexibly chosen by the implementor of the VDP service 102 or optionally made selectable by the user, though commonly a size should be selected so that the sample is at least somewhat representative of the entire dataset, so that issues present in the overall dataset are present in the sample (and thus able to be found by the user). Similarly, the method of sampling from the source dataset 128 may be flexibly chosen by the implementor of the VDP service 102 or optionally made selectable by the user, and may include sampling records at random, selecting according to a selection algorithm (e.g., every fifth record), selecting a first number of records and/or a last number of records, or the like.

In some embodiments, to provide data security, the sampling may be performed within the processing node(s) 160A (e.g., by code including or associated with recipe step code 126) via sending requests to obtain some or all of the source datasets 128, optionally using credentials associated with the user, and receiving that data in response. The dataset sample 124 in some embodiments is kept in memory (e.g., and not written to a persistent storage), which may ensure that upon the end of the need for the processing node(s) 160A the dataset sample 124 will be destroyed as well and no longer exist outside of the storage service(s) 104. However, in other embodiments the sampling may be performed by the orchestrator(s) 116, which may obtain the sample from the storage service(s) 104 and transmit it to the processing node(s) 160A. The recipe step code 126 (or associated code, such as an additional library or package referenced by the recipe step code 126 or analytics engine 122) may include general code (e.g., analytics code, pattern matching code, transformation code, sampling code) and may be modified (or called) to cause it to perform according to a particular job's needs, e.g., to fetch a particular source dataset 128, execute a particular group of recipe steps 140, and the like as described herein, upon invocations by the executed recipe step code 126.

With the dataset sample 124 loaded at circle (5)—such as within a Spark DataFrame—the analytics engine 122 generates summary data based on the dataset sample 124 as part of performing a "profiling" of the dataset sample. (In some embodiments, such a profiling may also be performed against the entire source dataset 128, too, and used in a similar manner.) The summary data may describe a size of the sample (e.g., a number of records or rows), describe a number of columns of the sample, describe the various types of data within the columns and provide summary statistical information of those values—e.g., minimums, maximums, ranges, median values, etc. For further example, the summary data may include a cardinality of the values of a column, identify the value distribution, a quartile distribution, the variances within the values, correlations between values, etc. This summary data—along with some or all of the sample itself—may be presented to the user via the console user interface, which may include a depiction of general summary data describing the entire dataset (e.g., number of rows, number of columns, etc.) and/or for each column, some or all of the sample's values for that column and summary statistics for that column (e.g., a number of rows, a number of unique values, an average value, a maximum and/or minimum value, and the like).

As indicated above, in some embodiments summary profile data corresponding to the entire source dataset 128 may similarly be presented. Accordingly, a user may be presented profile summary data for the sample and corresponding profile summary data for the entire source dataset, which helps reassure (or warn) the user that the sample is or is not representative of the entire source dataset. For example, the profile data may show that a column of the sample includes five distinct values, but the corresponding profile data of the entire source dataset may indicate that the same column of the entire dataset includes six distinct values—this may allow the user to craft different (and likely, better) steps for their recipe.

The user 108 may examine these sample data values and/or the summary data for one or multiple columns to identify particular aspects of the sample data to be modified to meet the user's desired needs. This process is referred to as the process of recipe creation, where a recipe 138 object identifying zero, one, or more recipe steps 140 (corresponding to particular modifications) is created at circles (6A) and (6B). A recipe may be separate from any particular dataset, and thus may be theoretically applied (or run against) other datasets. By way of example, during recipe creation the user may identify a column name that is improper and seek to rename the column. As another example, the user may identify certain erroneous values in a column that should be eliminated, changed, etc. As yet another example, the user may identify one or more additional columns to be added—which may or may not be based on existing columns, such as via a one-hot encoding process to break out different values into different columns—and/or identify one or more columns to be removed.

For each user-desired modification, the user may select and configure the modification to be performed (e.g., using graphical user interface elements such as buttons, text input boxes, radio buttons, checkboxes, and the like). Upon selecting a modification, the user's 108 computing device 110 may send a request to the VDP service 102 to test a modification associated with a recipe 138 being developed by the user, and an orchestrator(s) 116 may send the request to the associated processing node(s) 160A (e.g., via a set of recipe steps represented by recipe step code 126) identifying the particular configured transformation. This recipe step code 126 is then executed (or otherwise used) to perform the associated functions, via the analytics engine 122, that will apply the transformation(s) to the current dataset sample 124. As the dataset sample 124 is typically relatively small (in comparison to many typical source datasets 128), the application of the transformation will typically be quite fast, and a result of the processing—e.g., the updated dataset sample 124 or a subset of the dataset sample 124 that is changed—can be sent back to the computing device 110 and presented to the user 108 rapidly. In this manner, the effect of the transformation proposed to be added can be shown to the user 108, allowing the user 108 to determine whether the transformation was configured correctly, whether the transformation solved the problem or caused another problem, etc. The user 108 may then optionally change the transformation (e.g., modify its configuration, remove it entirely) and/or accept the transformation. Thus, the selection of a transformation by the user may cause the computing device 110 to send a request to add the configured transformation to the recipe 138 as a recipe step 140 at circle (6B), cause that transformation to be performed via the recipe step code 126 and analytics engine 122 to the current view of the dataset, and send the result of the transformation back to the user's device for review.

In some embodiments, the processing node(s) 160A are configured to maintain a history of the different versions of the dataset sample 124 (e.g., the different versions of a Spark DataFrame). This can enable the user to quickly undo or redo a transformation, e.g., by switching back to a previous or subsequent version of a dataset. Similarly, upon adding another transformation to a recipe, the processing node(s) may simply perform one transformation (corresponding to the newest recipe step) to a current view of the dataset instead of all recipe steps, and likewise when a transformation is removed or reconfigured (perhaps due to the user realizing that a transformation is not necessary or not configured properly), the processing node may simply switch back to a previous version of the dataset, and thus may not need to perform any actual transformations.

This process may continue in an iterative manner, adding, removing, and/or modifying recipe steps, until the user 108 is satisfied that the dataset sample 124 has been transformed into a format that is desired. The user 108 may then finalize the recipe creation process and, in some embodiments, schedule the recipe to be "applied" against the entire source dataset 128 (and/or another source dataset or datasets) at that point in time or at a later point in time (e.g., according to a schedule, one or multiple times, using the source dataset 128, another existing source dataset, or not-yet-existing source dataset). This may occur via a "job creation" and/or "schedule creation" user interface, where the user 108 may select or otherwise identify the particular recipe, provide an identifier of a source dataset(s), a job run timing (e.g., when and/or how many times to run the job), an output location for the resulting transformed output dataset 130, etc. In some embodiments, the identifier of the source dataset to be used may statically identify one exact source dataset, and in some embodiments the identifier of the source dataset may be more general, e.g., via providing a selection scheme to be used for identifying a source dataset (e.g., select a most recently dated file from a particular storage location, select a file from a storage location having a particular name matching that of a formula, etc.). Accordingly, during a first run of the job, a first source dataset may be selected, and during a subsequent run a different source dataset may be selected, such as when a new dataset is added to the storage location, etc.

The scheduling of the job runs may be implemented in one or more of a variety of ways, from allowing the user to immediately run the job, to run the job on a periodic basis (e.g., once an hour, once a day, etc.), to run the job based on an event occurring (e.g., a message arriving in a queue, a new file being uploaded to a dataset storage location), to run the job when a condition is satisfied (e.g., when a number of rows or records in a source dataset as defined by a selected logical "filtering" type condition meet or exceed a threshold, when a cardinality of a values of a column of a dataset meets a threshold, when a particular value is observed within a column of a dataset), etc.

Upon confirming the job and/or schedule, the computing device 110 sends a "job run" command to the VDP service 102, where a jobs 142 record and/or schedule 143 record can be stored at circle (7) and a corresponding job executed when needed, e.g., by the orchestrator(s) 116 obtaining the associated recipe 138, translating the recipe 138 into recipe script code 129 (e.g., a script code that may perform one or more of obtaining the job-associated source dataset 128, calling a number of functions to perform the recipe steps/ transformations using the analytics engine 122, and storing the output as output datasets 130) that is provided to processing node(s) 160B (here, "job nodes" used for running recipes on entire source datasets, which may perhaps be larger-sized than the processing node(s) 160A in terms of one or more compute resources such as memory, processor availability, etc.) at circle (8) and thereafter executed.

In some embodiments, when a processing node 160A-160B is needed the orchestrator(s) 116 may cause its creation, e.g., by launching a particular compute instance (e.g., virtual machine) and optionally configuring it with recipe step code 126 and/or a full recipe script 129, and configuring any other necessary components (e.g., analytics engine 122). As this takes some time, in some embodiments the VDP service 102 may maintain a "warm pool" of processing nodes 160A-160B that are running (or in a paused or semi-ready state) and can be used much more quickly. For example, the VDP service 102 may attempt maintain a particular threshold number of "spare" processing nodes 160A-160B that are available at all times, and thus when one or more are taken for use it may launch and configure additional ones.

Optionally, another service 150 may similarly utilize the VDP service 102 directly (e.g., by calling for a synchronous job run) or indirectly (e.g., by using output datasets 130, and/or configuring a scheduled or event-driven job run), such as by performing a data preparation job using the VDP service 102 within a larger system or pipeline (e.g., a machine learning pipeline that obtains data, processes it, and uses it for inference).

At the conclusion of a job run by the processing node(s) 160B, the output datasets 130 can be stored at circle (9), which may cause an event to be generated notifying an associated user of the writing of the file(s), though in some embodiments other notifications can be sent in other ways, e.g., via email or SMS, via a notification in the console, by inserting a record in another database or into a notifications stream or queue, etc.

For further illustration of these concepts and further functionalities provided in various embodiments, we turn to exemplary user interfaces shown in subsequent figures. FIG. 2 is a diagram illustrating an exemplary user interface 200 provided by an interactive visual data preparation service for creating a data preparation project according to some embodiments. In this user interface, which may be presented to a user via a console or other type of application, a user may provide information to the VDP service to generate a new data preparation project. In this example, a user may provide a project name 205, associate/select an existing recipe or create a new recipe associated with the project at 210, and optionally import 215 a set of recipe steps from an existing recipe.

The user interface 200 also includes one or more user input elements 220 (here, buttons) allowing the user to select a dataset to be used in the project, whether it is previously-imported dataset (of several shown in user interface element 225), a sample dataset for the sake of learning or exploration, or a new dataset that can be imported (e.g., one that already exists in a storage service, one that is uploaded by the user—and optionally stored at the storage service—as one or more files, etc.).

For example, in some embodiments, a user may create a dataset via another user interface, e.g., by providing a name of a dataset, formatting options indicating how the input data is to be interpreted (e.g., whether the dataset includes embedded newline characters, etc.), a location of the source dataset (e.g., an identifier of an object store of a storage service or a file stored therein, an identifier of a metadata catalog already tracking the dataset, etc.), one or more metadata tags to apply to the dataset, etc. Upon providing some or all of the data, the user may cause their computing device to submit a CreateDataset request to the VDP service 102, which may create a dataset object record in its datastore. This creation may involve performing one or more security or permissions related checks, such as by interacting with another service that has stored permissions and/or security information that may indicate whether the requesting user does or does not have permission to access or use the dataset in a particular manner. Similar other dataset-related API method calls may similarly be implemented using similar user interfaces, e.g., a DescribeDataset call to retrieve details of the dataset object, a DeleteDataset call to delete the dataset object, a ListDatasets call to retrieve a list of identifiers of available (to the user) datasets, an Update-Dataset to allow the user to change one or more values of the dataset object, etc.

In the case of selecting a dataset that is already associated with the user's account (or an associated user's account granting permission to the user to access a dataset, such as through a separate authorization or security service of the provider network), the user interface element 225 may provide descriptive information about the available datasets, such as the dataset name, type of data (e.g., stored in the Parquet format, comma separated values (CSV), as a spreadsheet file (e.g., in Microsoft Excel Open XML Format (XLSX)), a location or source of the dataset, when the dataset was "created" (e.g., associated with a dataset object in the context of the VDP service), the username of the user who created the dataset, etc.

The user interface 200 may also include a sampling element 230—here, shown in a collapsed state—allowing the user to indicate how a sample is to be obtained from the dataset. For example, the user may indicate or select a number of dataset records (e.g., rows) for the sample, and/or a selection scheme (e.g., random, first X rows, last X rows, a logical condition based on values of the records, etc.) for selecting particular dataset records to be included in the sample. The user interface 200 may also include a tagging element 235, allowing users to associate user-defined tags (e.g., alphanumeric strings) with the project, which can be useful for user tracking/searching of resources, granting permissions, etc.

Upon finalizing their selections, the user may choose to create the project, e.g., by selecting the "create project" user interface element 240 (here, a button), resulting in the user's device sending an API-type "create project" request to an endpoint associated with the VDP service 102, for example in JSON format, where DatasetName is the name of the dataset the project is to be associated with (e.g., a string of length 1-255), ProjectName is a unique name for the project (e.g., a string of length 1-255), RecipeName is the name of an existing receipt to associated with the project (e.g., a string of length 1-255), a Sample object providing a sample size (e.g., a number of rows) and sampling type (e.g., first, last, random) to use for interactive data analysis, and a Tags object providing one or more metadata tags to apply to the project.

Similar other recipe-related API method calls may similarly be implemented using similar user interfaces, e.g., a DescribeRecipe call to retrieve details of the recipe object, a DeleteRecipe call to delete the recipe object, a ListRecipes call to retrieve a list of identifiers of available (to the user) recipes, an UpdateRecipe call to allow the user to change one or more values of the recipe object, etc.

Upon submitting the request to create the recipe, the VDP service 102 may insert/update a recipe object in its datastore and acquire and/or provision a processing node 160A for the user's interactive recipe creation session. For example, the VDP service 102 may cause the processing node 160A to obtain a sample from the user-specified dataset according to any user-provided sampling values (e.g., size, type of sample) and load the sample dataset into its working space (e.g., as a Spark DataFrame). The processing node 160A may automatically begin a data profiling procedure on the entire source dataset and/or just the sample dataset as described herein, e.g., to generate statistics about the entire dataset (e.g., a size, number of rows, number and/or type of columns, etc.) and/or individual columns (e.g., a column identifier/name, a predicted datatype of the column, a number of values in the column, a cardinality of values in the column, counts of different values in the column, etc.).

Figure 3:
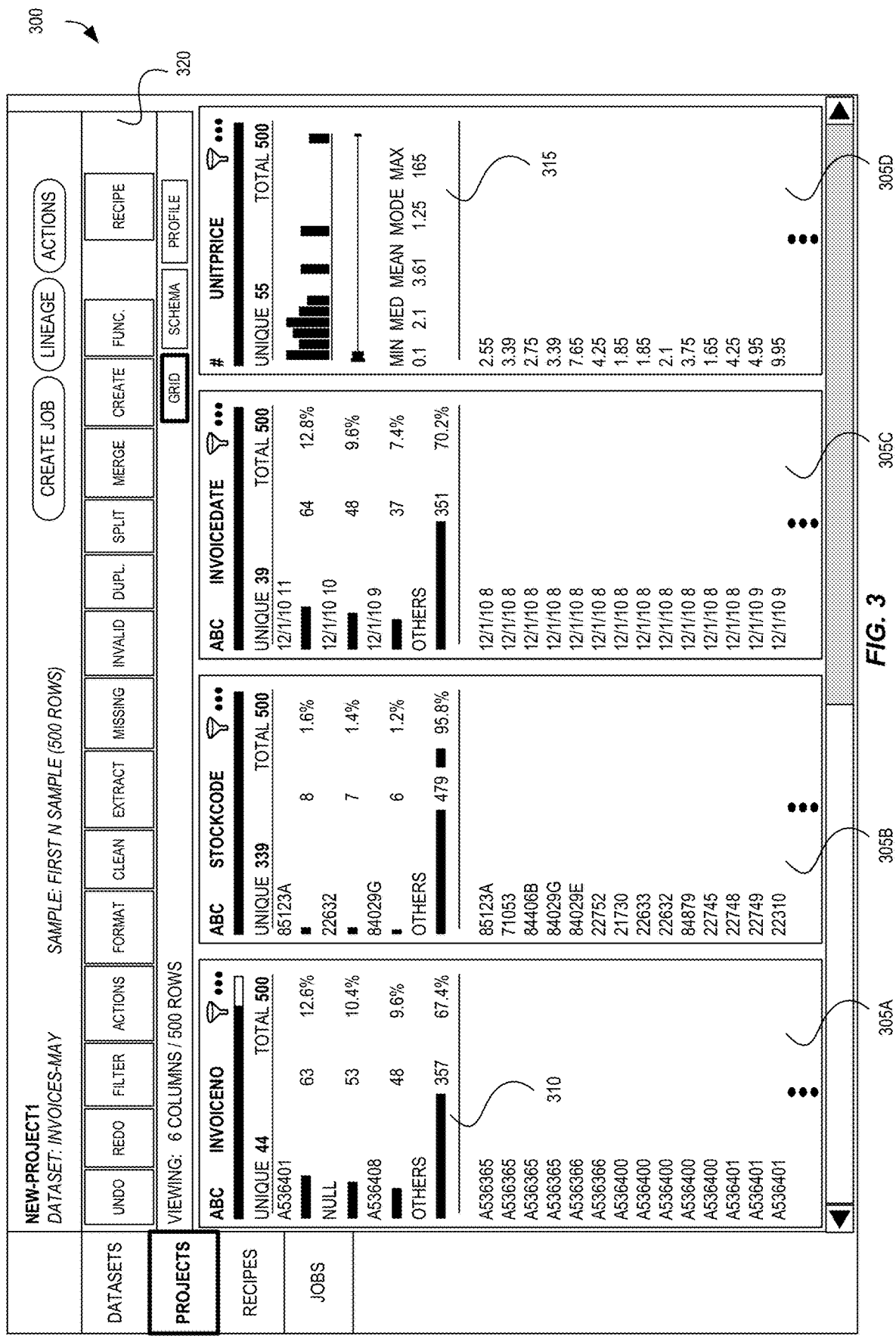
FIG. 3 is a diagram illustrating an exemplary user interface provided by an interactive visual data preparation service for viewing a dataset sample and summary statistics according to some embodiments.

After loading the sample and performing the profiling on the entire source dataset and/or sample dataset, the VDP service 102 may cause the sample dataset and profiling data to be presented to the user. For example, FIG. 3 is a diagram illustrating an exemplary user interface 300 provided by an interactive visual data preparation service for viewing a dataset sample and summary statistics according to some embodiments. In this example, some values from a few of the columns are visible in user interface elements 305A-305D, allowing the user to see what types of data exist, what values exist, etc. Each column also has an associated user interface portion showing summary statistics (e.g., from column-based profiling) for the column.

For example, portion 310 of the first column shows information representing the detected type of the column (e.g., "text," represented via the display of the graphical "ABC"), the detected name of the column ("INVOICENO"), a progress-type bar graph indicating how many of the total number of records/rows have a valid value (e.g., not NULL, as shown by the bar graph that is filled solid approximately 448/500 of the way), a textual indicator indicating how many total records/rows exist (e.g., "TOTAL 500"), an indicator of the number of unique values in the column ("UNIQUE 44"), as well as a breakdown of the top number of values—here, the value "A536401" appears 63 times, making up 12.6% of the overall sample. Likewise, the value NULL appears 53 times, making up 10.4% of the overall sample.

As another example, portion 315 for the fourth column shows information representing the detected type of the column (e.g., "numeric," represented via the display of the graphical "#" symbol), the detected name of the column ("UNITPRICE"), a progress-type bar graph (and textual indicator) indicating how many of the total number of records/rows have a valid value in them within this column (e.g., "TOTAL 500" and the bar graph above that is filled solid approximately 500/500, or 100%, of the way), an indicator of the number of unique values in the column ("UNIQUE 55"). However, this portion 315 includes a different summary of values based on the column having a different inferred type of values. As shown, a histogram of sorts is displayed showing a rough breakdown of the values that exist in the column—here, most values are on the left-hand side, but some number of values are far away on the right-hand side, which may or may not indicate to the user that there might be a problem with those values to be addressed (e.g., via a transformation/recipe step). A box plot of the values may also be shown. The portion 315 also includes statistical data pertaining to the values of the column, here reflected as a minimum value (0.1), a median value (2.1), a mean value (3.61), a mode value (1.25), a maximum value (165), and other and/or different statistical measure may similarly be used (e.g., standard deviation, etc.)

In this manner, the user is provided easy-to-navigate information describing the sample, such as this statistical-type information, inferred information, and actual values of the columns that can be browsed and inspected, enabling the user to spot issues to be addressed and thus identify, test out, and apply transformations (in the form of recipe steps) to the dataset to cleanse and format the data in a desired manner.

In some embodiments, the user may use user interface element 320 (here, a tool bar of icons, though other interface elements known to those of skill in the art can be used, such as via use of drop-down boxes, checkboxes, links, etc.) to select and/or configure a transformation to be applied to the dataset. The transformation may be specific to a particular column, and thus the user may select the column before or after selecting one of the icons, or it may be broadly applicable to the entire sample.

Figure 4:
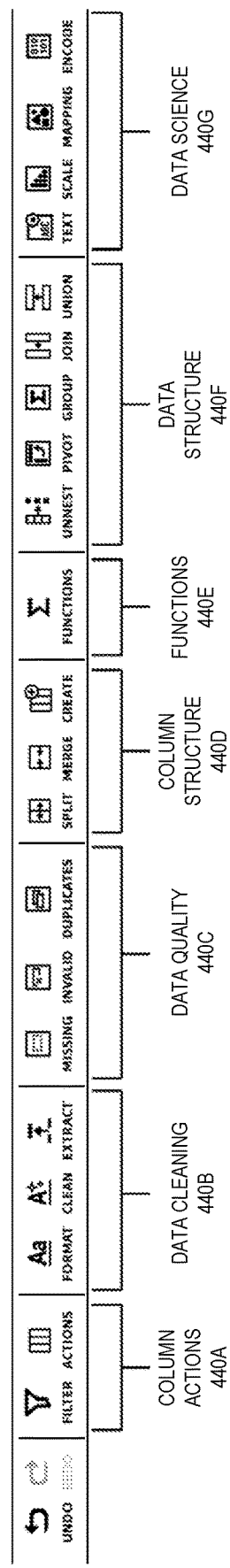
FIG. 4 is a diagram illustrating an exemplary user interface portion provided by an interactive visual data preparation service for providing users user-selectable transformations according to some embodiments.

For example, FIG. 4 is a diagram illustrating an exemplary user interface portion 420 (e.g., corresponding to user interface element 320) provided by an interactive visual data preparation service for providing users user-selectable transformations according to some embodiments. As shown, this user interface portion 420—a toolbar of icons—allows the user to test out transformations and other modifications to the sample dataset. For example, two icons 430 for "redo" and "undo" may be provided that cause the processing node 160A to redo or undo a transformation (one or more steps), which may be accomplished by actually recomputing the current sample dataset or, in some embodiments, maintaining a history of datasets (as they change) and swapping between use of these datasets accordingly.

In some embodiments, to implement this "undo" and/or "redo" functionality, complete copies of the datasets need not be maintained by the processing node 160A (or by in a remote storage location); instead, in some embodiments the processing node 160A stores one or more complete copies of a dataset and then stores changesets of the dataset, each changeset including only the data that has changed from a previous version of the sample dataset, which itself may be a full copy of the sample dataset or a constructed view of the sample dataset based on one or more changesets and a full sample dataset. Alternatively, in some embodiments the processing node 160A periodically captures and caches a full copy of the sample dataset, and maintains an ordered copy of the transforms that have been applied to that dataset, and thus the processing node 160A may reconstruct a particular (e.g., current or historic) materialized view of the sample dataset (needed to fulfill a redo or undo) by identifying a most recent in time sample dataset (prior to the desired point in time) and applying all—if any—transformations occurring after that sample dataset but prior to the desired point in time.

The toolbar of icons in FIG. 4 also includes column actions 440A icons, allowing a user to filter (e.g., remove) rows or values having a particular value satisfying a condition (e.g., being greater than a threshold, less than a threshold, having a particular value, being in or outside of a range, etc.). These types of available transformations made available by selecting these or other icons may vary based on what column is selected—e.g., a text column may have different transformations made available than a column of numbers or boolean values, for example. Particular transformations that belong to a class of transforms represented by a selected icon may be presented to the user in a new or popup panel, where the user may configure the transformation with particular parameter values (e.g., threshold values, conditions, and the like).

The data cleaning 440B icons can allow users to format, clean, or extract values of a column. For example, formatting transformations may include formatting all text values in a column to uppercase, or lowercase, or capital case, or sentence case, etc. As another example, cleaning transformations may include replacing particular values with other values, such as empty values with a NULL value, removing "special" characters like whitespace or punctuation (so that only alphanumeric characters remain). Extraction transformations may include removing particular characters or values from the data.

A set of data quality 440C icons can allow users to act on missing values, act on invalid values, and/or act on duplicate values. For example, the "missing" icon may allow users to delete rows with missing values, fill missing values with an "empty" value, fill missing values with a null value, fill missing values with a last valid value, fill missing values with a most frequent value, fill missing values with a custom value, or the like. Similarly, for invalid values (e.g., not matching a type of the column, not existing within a defined range of valid values, etc.) the "invalid" icon may allow for similar types transformations as the missing icon. Further, the duplicates icon may allow for the user to perform transformations on duplicate column values or duplicate rows, e.g., by deleting one or more duplicated values or rows, adjusting the duplicated values or rows in some manner (e.g., by appending a character to a duplicated value), etc.

A set of column structure 440D icons may allow users to split columns (e.g., create multiple columns of data based on one column), merge columns (e.g., create a single column from two or more columns), or create a new column (which may or may not be based on values of other columns). For example, the split icon may allow users (e.g., via a drop-down menu and/or panel) to split a column into multiple columns based on delimiters (e.g., a single delimiter, multiple delimiters, between delimiters), based on positions (e.g., a position measured from the beginning of a value such as a split after the third character, a position measured from the end of a value, between positions, at regular intervals, etc.), or other technique. By way of example, a column storing some representation of a combined date and time (e.g., "2020-05-06 11", where the value "11" may be a stored hour of day) could be split into two new columns using a whitespace delimiter, position (e.g., after the tenth character), etc., to yield a first new column with the date ("2020-05-06") and a second new column with the time type value ("11"). Similarly, users may merge one or more columns with the merge icon (e.g., create a new column by combining the values, with whitespace between each, from three particular columns) and/or create a new column altogether (e.g., an auto-incrementing column of integers starting with 0 or 1, a column of text or numbers that is set based on the value of another column, etc.)

A larger set of general functions may be exposed via a functions 440E icon. The functions may include one or more of math, aggregation, text, date, window, web, and/or other miscellaneous functions. Some example functions (each associated to a transform) used in some embodiments are as follows:

| Math functions: | | |
|---|---|---|
| FUNCTION | SUMMARY | DESCRIPTION |
| add | Sum of the column values. | Sums the column values in a new column, using (SourceColumn1 + SourceColumn2) or (SourceColumn + Custom Input). |
| absolute | Absolute value of a number. | Returns the absolute value of the input number (how far the number is from zero, regardless of whether it is positive or negative) in a new column. |
| ceiling | Smallest integer greater than a decimal number. | Returns the smallest integer number greater than or equal to the input decimal numbers in a new column. The formula is Math.ceiling(SourceColumn or value). |

Math functions:

| FUNCTION | SUMMARY | DESCRIPTION |
| --- | --- | --- |
| degrees | Converts radians for an angle to degrees. | Converts radians for an angle to degrees and returns the result in a new column. The formula is (SourceColumn or value) * (180/pi). |
| divide | Divides one number by another. | Divides one input number by another and returns the result in a new column. The formula is (SourceColumn1/SourceColumn2) or (SourceColumn/Value). |
| exponent | Euler's number raised to the nth degree. | Returns Euler's number raised to the nth degree in a new column. The formula is Math.pow(2.718281828, SourceColumn or value). |
| floor | Largest integral number greater than or equal to a number. | Returns the largest integral number greater than or equal to an input number in a new column. The formula is Math.floor(SourceColumn or value). |
| isEven | True for even values. | Returns a Boolean value in a new column that indicates whether the source column or value is even. If the source column or value is a decimal, the result is false. |
| isOdd | True for odd values. | Returns a Boolean value in a new column that indicates whether the source column or value is odd. If the source column or value is a decimal, the result is false. |
| ln | Calculates the natural log of a value. | Returns the natural logarithm (computed using Euler's number) of a value in a new column. The formula is Math.log(SourceColumn or Value, 2.718281828). |
| log | Calculates the log of a value. | Returns the log of a value in a new column. The formula is Math.log(SourceColumn or Value, base). |
| mod | Calculates the percent that one number is of another number. | Returns the percent that one number is of another number in a new column. The formula is SourceColumn1 % SourceColumn2) or (SourceColumn % Value). |
| multiply | Multiplies two numbers. | Multiplies two numbers and returns the result in a new column. The formula is (SourceColumn1 * SourceColumn2) or (SourceColumn * Value). |
| negate | Negates a value. | Negates a value and returns the result in a new column. The formula is (SourceColumn or value) * −1. |
| pi | The value of pi | Returns the value of pi (e.g., 3.141592653589793) in a new column |
| power | The value of a number to the power of the exponent. | Returns the value of a number to the power of the exponent in a new column. The formula is Math.pow(SourceColumn or Value, Exponent). |
| radians | Converts degrees to radians (divides by 180/pi). | Converts degrees to radians (divides by 180/pi) and returns the value in a new column. |
| rand | Random number between 0 and 1. | Returns a random number between 0 and 1 in a new column. |
| randBetween | Random number between a specified upper and lower bound. | In a new column, returns a random number between a specified lower bound (inclusive) and a specified upper bound (inclusive). |
| round | Rounds a numerical value to the nearest integer. | Rounds a numerical value to the nearest integer in a new column. The formula is Math.round(SourceColumn or value). It rounds up when fraction is 0.5 or more. |
| sign | The sign, either −1, 0, or +1, of a numerical value. | Returns a new column with −1 if the value is less than 0, 0 if the value is 0, and +1 if the value is greater than 0. |
| squareRoot | The square root of a value. | Returns the square root of a value in a new column. The formula is sqrt(SourceColumn or value). If the value is a negative number, the result is null. |
| subtract | Subtracts one number from another. | Subtracts one number from another and returns the result in a new column. The formula is (SourceColumn1 − SourceColumn2) or (SourceColumn − Value). |

Aggregate functions:

| FUNCTION | SUMMARY | DESCRIPTION |
| --- | --- | --- |
| any | Returns any values from the selected source columns. | Returns any values from the selected source columns in a new column. Empty and null values are ignored. |

-continued

Aggregate functions:

| FUNCTION | SUMMARY | DESCRIPTION |
|---|---|---|
| average | Calculates the average of the values in the source columns. | Returns the average of the values in the source columns in a new column. Any non-number is ignored. |
| count | The number of values in the source columns. | Returns the total number of values from the selected source columns in a new column. Empty and null values are ignored. |
| countDistinct | The total number of distinct values from the source columns. | Returns the total number of distinct values from the selected source columns in a new column. Empty and null values are ignored. |
| kthLargest | The kth largest number from selected columns. | Returns the kth largest number from the selected source columns in a new column. |
| kthLargestUnique | The kth largest unique number from selected columns. | Returns the kth largest unique number from the selected source columns in a new column. |
| list | An ordered list of values from selected columns. | Returns an ordered list of values from selected columns in a new column. |
| listUnique | An ordered list of unique values from selected columns. | Returns an ordered list of unique values from the selected source columns in a new column. |
| max | Maximum value from selected columns. | Returns the maximum numerical value from the selected source columns in a new column. Any non-number is ignored, |
| min | Minimum value from selected columns. | Returns the minimum value from the selected source columns in a new column. Any non-number is ignored. |
| mode | The mode from selected columns. | Returns the mode (the number that appears most often in each row) from the selected source columns in a new column. Any non-number is ignored. If the columns contain multiple modes, the mode that is displayed depends on the selected modal function: null, min, max, or average. |
| stddev | Standard deviation from selected columns. | Returns the standard deviation from the selected source columns in a new column. |
| sum | Sum of numerical values from selected columns. | Returns the sum of the numerical values from the selected source columns in a new column. |
| var | The variance from selected source columns. | Returns the variance from the selected source columns in a new column. Variance is defined as $Var(X) = [Sum ((X - mean(X))^2)]/Count(X)$. |
| median | Returns the median from selected source columns. | Returns the median (that is, the middle number of the group of numbers when they are sorted), from the selected source columns in a new column. Any non-number is ignored. |

Text functions:

| FUNCTION | SUMMARY | DESCRIPTION |
|---|---|---|
| char | Unicode character for each input integer. | Returns in a new column the Unicode character for each integer in the source column or for one or more custom integer values. |
| unicode | Unicode index value for the first character. | Returns in a new column the Unicode index value for the first character of the strings in the source column or for custom strings. |
| upper | Converts characters to uppercase. | Converts all alphabetical characters from the strings in the source column or custom strings to uppercase, and returns the result in a new column. |
| Lower | Converts characters to lowercase. | Converts all alphabetical characters from the strings in the source column or custom strings to lowercase, and returns the result in a new column. |

-continued

| | Text functions: | |
|---|---|---|
| FUNCTION | SUMMARY | DESCRIPTION |
| proper | Converts characters to proper case. | Converts all alphabetical characters from the strings in the source column or custom values to proper case, and returns the result in a new column. |
| trim | Removes leading and trailing white space. | Removes leading and trailing white space from the strings in the source column or custom strings, and returns the result in a new column. Spacing between words isn't removed. |
| removeWhiteSpace | Removes white space. | Removes white space from the strings in the source column or custom strings, and returns the result in a new column. |
| removeSymbols | Removes symbol characters | Removes characters that aren't letters, numbers, accented Latin characters, or white space from the strings in the source column or custom strings, and removeSymbols or white space. white space from the strings in the source column or custom strings, and returns the result in a new column. |
| len | The length of input strings. | Returns in a new column the length of strings from the source column or of custom strings. |
| find | Searching left to right, finds strings that match a specified string. | Searching left to right, finds strings that match a specified string from the source column or from a custom value, and returns the result in a new column. |
| rightFind | Searching right to left, finds strings that match a specified string. | Searching right to left, finds strings that match a specified string from the source column or from a custom value, and returns the result in a new column. |
| substring | Some or all of specified strings based on start and end values. | Returns in a new column some or all of the specified strings in the source column, based on the user-defined starting and ending index values. |
| substitute | Replaces a found pattern with a new value. | Finds a pattern in the strings in the source column, replaces the pattern with a new value, and returns the result in a new column. |
| left | The specified number of leftmost characters. | Given a number of characters, takes the leftmost number of characters in the strings from the source column or custom strings, and returns the specified number of leftmost characters in a new column. |
| right | The specified number of the rightmost characters. | Returns the specified number of rightmost characters from the sourcecolumn or custom strings in a new column. |
| merge | Merges the strings in the source columns. | Merges the strings in the source columns and returns the result in a new column. You can insert a delimiter between the merged values. |
| startsWith | True if the leftmost characters match the pattern. | Returns true in a new column if a specified number of leftmost characters matches a pattern. Characters can come from a source column or custom input. |
| endsWith | True if the rightmost characters match the pattern. | Returns true in a new column if a specified number of rightmost characters matches a pattern. Characters can come from a source column or custom input. |
| repeat | Repeats strings a specified number of times. | Repeats the strings in the source column or custom input a specified number of times and returns the result in a new column. |
| exact | Returns true if strings match the pattern. | Returns true in a new column if the strings in the source column or custom input match a pattern. |
| StringGreaterThan | True if first column strings are greater than second column strings. | Returns true in a new column if the strings in the first source column evaluate to be greater than the strings in the second source column, or in custom input, based on a set of common collation rules. |
| stringGreaterThanEqual | True if first column strings are greater than or equal to second column strings. | Returns true in a new column if the strings in the first source column evaluate to be greater than or equal to the strings in the second source column or in custom input, based on a set of common collation rules. |

Text functions:

| FUNCTION | SUMMARY | DESCRIPTION |
| --- | --- | --- |
| stringLessThan | True if first column strings are less than second column strings. | Returns true in a new column if the strings in the first source column evaluate to be less than the strings in the second column or in custom input, based on a set of common collation rules. |
| stringLessThanEqual | True if first column strings are less than or equal to second column strings. | Returns true in a new column if the strings in the first source column evaluate to be less than or equal to the strings in the second column or in custom input, based on a set of common collation rules. |
| doubleMetaphone | Returns phonetic encodings for strings in the source column. | Returns in a new column a two-element array of primary and secondary phonetic encodings for the strings in the source column or in custom input, based on the Double Metaphone algorithm. |
| doubleMetaphoneEquals | True if phonetic encodings match between two strings. | Returns true in a new column if the strings in the first source column matches the two-element array of primary and secondary phonetic encodings for the strings in the second source column or in custom input, based on the Double Metaphone algorithm. |

Date functions:

| FUNCTION | SUMMARY | DESCRIPTION |
| --- | --- | --- |
| date | Returns the date value. | Returns in a new column the date value from the source columns or from values provided. |
| time | The time value. | Returns in a new column the time value from the source columns or from values provided. |
| dateTime | The date and time value. | Returns in a new column the date and time value from the source columns or from values provided. |
| dateAdd | Adds a year, month, or day to a date. | Adds a year, month, or day to the date from the source columns or from values provided, and returns the result in a new column. |
| dateDiff | The difference of a date unit between two source columns. | Returns in a new column the difference of a date unit (year, month, or day) between source column 1 or value 1 and source column 2 or value 2. |
| dateFormat | Converts a date to a selected date format. | Converts a date specified in a source column or in custom input to a selected date format, and returns the result in a new column. |
| month | A month number for a date. | Returns in a new column the number that represents the month, based on a source column or custom input. |
| monthName | A month name for a date. | Returns in a new column the name that corresponds to the month number, based on a source column or custom input. |
| year | The number that represents the year. | Returns in a new column the number that represents the year, based on a source column or custom input. |
| day | The number that represents the day of the month. | Returns in a new column the number that represents the day of the month, based on a source column or custom input. |
| weekDay | The number that represents the day of the week. | Returns in a new column the number that represents the day of week, based on a source column or custom input. |
| weekNumber | The number that represents the week of the year. | Returns in a new column the number that represents the week of the year |
| hour | The number that represents the specified hour. | Returns the number that represents the hour from a source column or custom input in a new column. |
| minute | The number that represents the specified minute. | Returns the number that represents the minute from a source column or custom input in a new column. |
| second | The number that represents the specified second. | Returns the number that represents the second from a source column or custom input in a new column. |
| unixTime | The Unix time value for a specified date. | Returns in a new column the number representing the Unix time (unixTime) for a date since Jan. 1, 1970, based on a source column or custom input. If time zone can be inferred, output is in that time zone, otherwise in UTC. |

Date functions:

| FUNCTION | SUMMARY | DESCRIPTION |
| --- | --- | --- |
| unixTimeFormat | Converts Unix time to a specified date format. | Converts Unix time for a source column or custom input to a specified numerical date format in a specified time zone, and returns the result in a new column. |
| now | The current date and time. | Returns in a new column the current date and time (format: 2017-02-15.11:46:12). If no time zone is specified, this function returns UTC time. |
| today | The current date. | Returns the current date in a new column (format: 2017-02-15). If no time zone is specified, this function returns UTC time. |

Window functions:

| FUNCTION | SUMMARY | DESCRIPTION |
| --- | --- | --- |
| prev | The value from a row at a specified number earlier in the source column. | Returns a new column where the value of each row is that from a row at a specified number earlier in the source column. |
| next | The value from a row at a specified number later in the source column. | Returns a new column where the value of each row is that from a row at a specified number later in the source column. |
| fill | Fills any missing or null values in the specified column with the most recent non-blank value. | Returns a new column based on a specified source column but with missing or null values filled with the most recent non-blank value from a specified number of rows before. |
| session | Returns a session identifier. | Returns a session identifier in a new column based on a selected date or timestamp column, grouped by selected columns and optionally ordered by a selected column or columns. |
| rowNumber | Row numbers sorted by the order parameter, grouped by the group parameter. | Returns in a new column the row number as sorted by the order parameter and optionally grouped by the group parameter. |
| rollingSum | Rolling sum of values from rows before and after the current row. | Returns in a new column the rolling sum of values from a specified number of rows before to a specified number of rows after the current row in the specified column. |
| rollingMin | Rolling minimum of values from rows before and after the current row. | Returns in a new column the rolling minimum of values from a specified number of rows before to a specified number of rows after the current row in the specified column. |
| rollingMax | Rolling maximum of values from rows before and after the current row. | Returns in a new column the rolling maximum of values from a specified number of rows before to a specified number of rows after the current row in the specified column. |
| rollingCountA | Rolling count of non-null values from rows before and after the current row. | Returns in a new column the rolling count of non-null values from a specified number of rows before to a specified number of rows after the current row in the specified column. |
| rollingAverage | Rolling average of values from rows before and after the current row. | Returns in a new column the rolling average of values from a specified number of rows before to a specified number of rows after the current row in the specified column. |
| rollingMode | Rolling mode (most common value) from rows before and after the current row. | Returns in a new column the rolling mode (most common value) from a specified number of rows before to a specified number of rows after the current row in the specified column. |
| rollingVar | Rolling variance of values from rows before and after the current row. | Returns in a new column the rolling variance of values from a specified number of rows before to a specified number of rows after the current row in the specified column. |

-continued

| | Window functions: | |
|---|---|---|
| FUNCTION | SUMMARY | DESCRIPTION |
| rollingStDev | Rolling standard deviation of values from rows before and after the current row. | Returns in a new column the rolling standard deviation of values from a specified number of rows before to a specified number of rows after the current row in the specified column. |
| rollingKthLargest | Rolling kth largest value from rows before and after the current row. | Returns in a new column the rolling kth largest value from a specified number of rows before to a specified number of rows after the current row in the specified column. |
| rollingKthLargestUnique | Rolling unique kth largest value from rows before and after the current row. | Returns in a new column the rolling unique kth largest value from a specified number of rows before to a specified number of rows after the current row in the specified column. |

| | Web functions: | |
|---|---|---|
| FUNCTION | SUMMARY | DESCRIPTION |
| ipToInt | Converts an IPv4 value to an integer. | Converts the IPv4 value of the source column or other value to the corresponding integer value in the targetcolumn, and returns the result in a new column. This function works for IPv4 only. |
| intToIp | Converts an integer to an IPv4 value. | Converts the integer value of source column or other value to the corresponding IPv4 value in then targetcolumn, and returns the result in a new column. This function works for IPv4 only. |
| urlParams | Extracts query parameters from a URL. | Extracts query parameters from a URL string, and returns the result in a new column. |

| | Miscellaneous functions: | |
|---|---|---|
| FUNCTION | SUMMARY | DESCRIPTION |
| coalesce | First non-null value in the array of columns. | Returns in a new column the first non-null value found in the array of columns. The order of the columns listed in the function determines the order in which they're searched. |

A set of data structure 440F icons may allow users to modify the structure of the values in the dataset, such as through unnesting of data, pivoting of the data, grouping of the data, joining different datasets (e.g., in the database sense), performing unions between different datasets, etc. For example, a user may "join" different datasets under a same user interface "view" in a variety of ways, such as by joining datasets in different file or representation formats (e.g., CSV file versus a relational database), storage locations, etc.

A set of data science 440G icons may allow users to perform transformations that may be useful for machine learning or involve the use of machine learning, such as by generating properly formatted training data or inference data. For example, a text icon may provide a set of textual transformations, such as tokenizing, removing stop words, stemming (e.g., Porter, Lancaster, Snowball), etc., which may optionally involve the use of ML models (e.g., to tokenize a string). The scale icon may provide the ability to perform data scaling type operations, such as normalizing the data or otherwise scaling it to another range. The mapping icon can allow data mapping to, e.g., enable the creation of mapped columns via categorical mapping (e.g., a first most-occurring value is replaced with the value '1' in a new column, the second most-occurring value is replaced with the value of '2' in the new column, and the like). The encoding icon can similar provide access to encoding transformations, which may encode the values into a different encoding (e.g., implement one-hot encoding to create multiple columns corresponding to different values in the original column) or into a particular ML-based embedding (e.g., via use of an ML model or portions thereof, such as one or more embedding generator layers of a neural network). Accordingly, in some embodiments, to perform some types of transformations, the analysis system 118 may itself issue calls to other service(s) 150, such as to a ML-backed service that performs one-at-a-time or batch transformations (e.g., to translate text, to stem or tokenize a word, to identify categories of text such as sentiment, etc.).

Turning back to the user interface 300 of FIG. 3, at or near the time of this first displaying of the sample dataset and summary statistics, the orchestrator(s) 116 may in some embodiments generate a recipe object and may, upon the user selecting transformations using this interface, generate recipe steps associated with the recipe object (e.g., responsive to API calls issued by the user's computing device upon selecting/configurating a transformation), for example.

Figure 5:
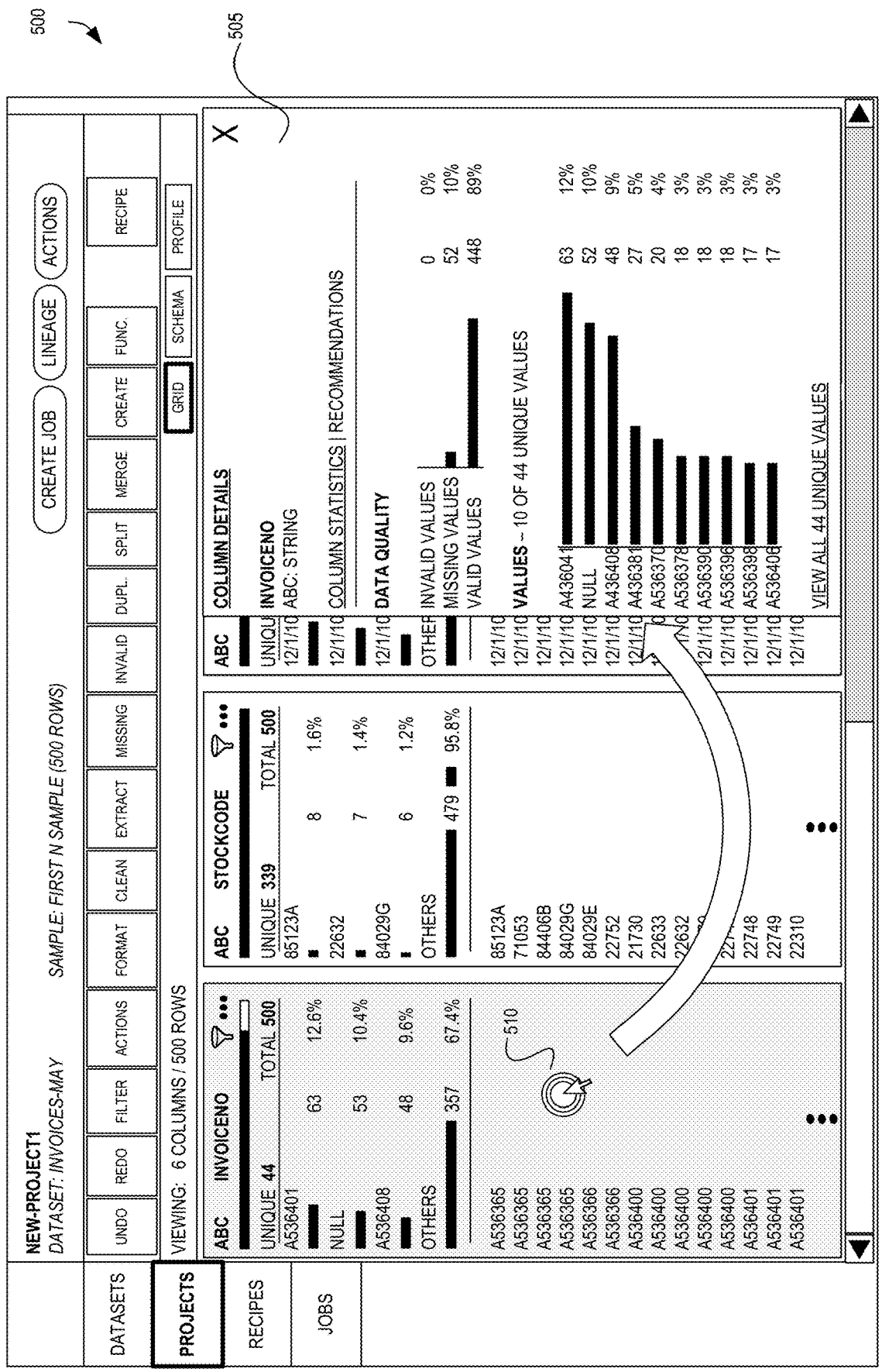
FIG. 5 is a diagram illustrating an exemplary user interface including an information panel provided by an interactive visual data preparation service for viewing columnar summary data according to some embodiments.

For example, turning ahead, FIG. 5 is a diagram illustrating an exemplary user interface 500 including an information panel 505 provided by an interactive visual data preparation service for viewing columnar summary data according to some embodiments. In some embodiments, when a user selects a particular column (e.g., via clicking, tapping, or otherwise selecting that user interface element associated with the column) at 510, an information panel 505 may be displayed that displays additional information pertaining to that column, such as more in-depth statistical or profile information. The information panel 505 may also provide the ability for the user to view a set of transformation recommendations for the column.

Figure 6:
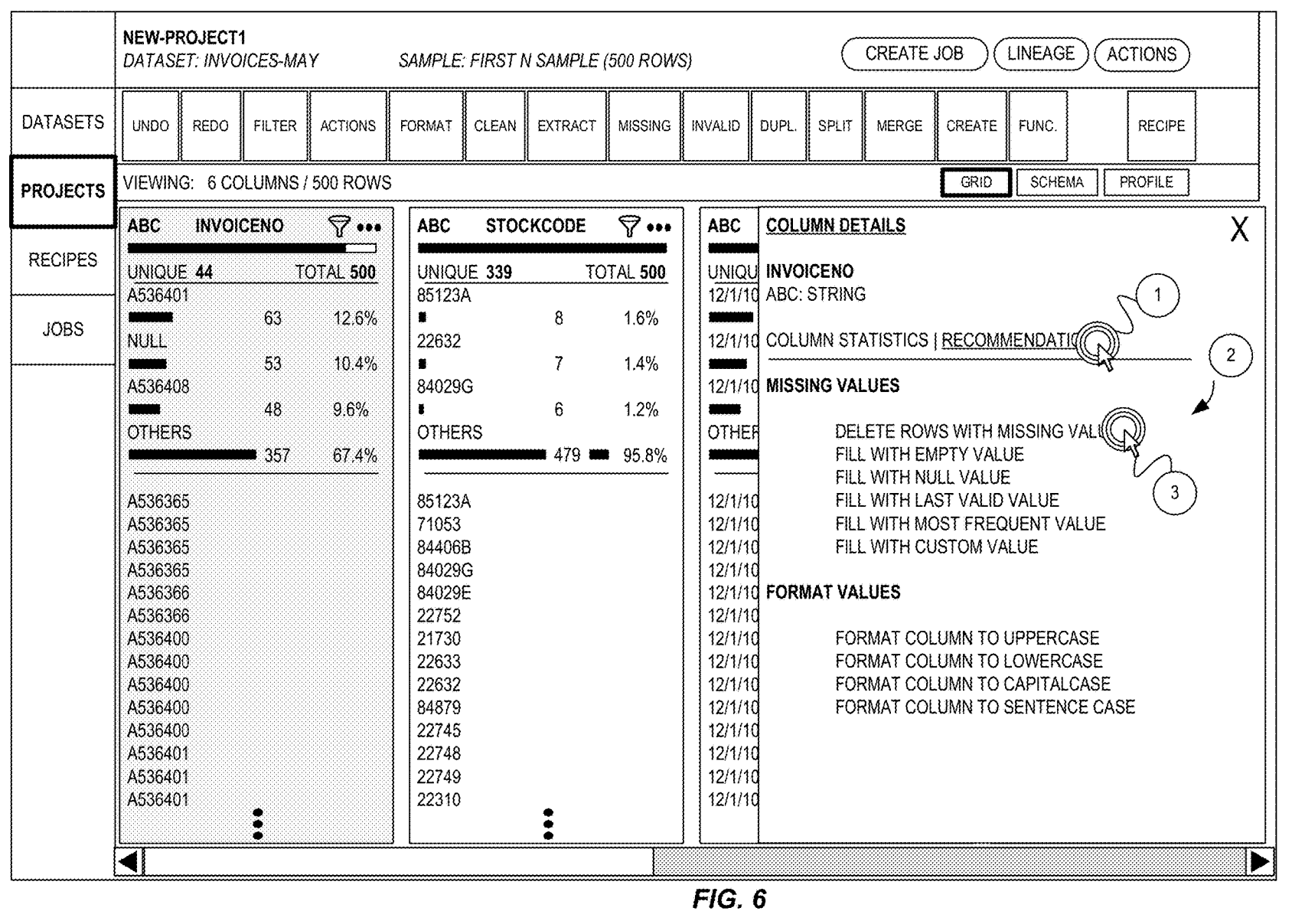

For example, FIG. 6 is a diagram illustrating the exemplary user interface including the information panel provided by an interactive visual data preparation service for viewing columnar transformation recommendations according to some embodiments. Upon selecting the user interface input element (e.g., a link or button) corresponding to "recommendations" at circle (1), the information panel 505 may be updated at circle (2) to suggest one or more possible transformations that may be helpful. The one or more possible transformations may be suggested, e.g., using heuristics or logical type rules based on statistical features of the sample dataset. For example, if a non-zero number of rows exist that have missing values, a set of missing value related transformations may be suggested; similarly, if the type of the values is inferred to be text/alphanumeric strings, a set of text formatting recommendations may be made as shown in this figure.

Figure 7:
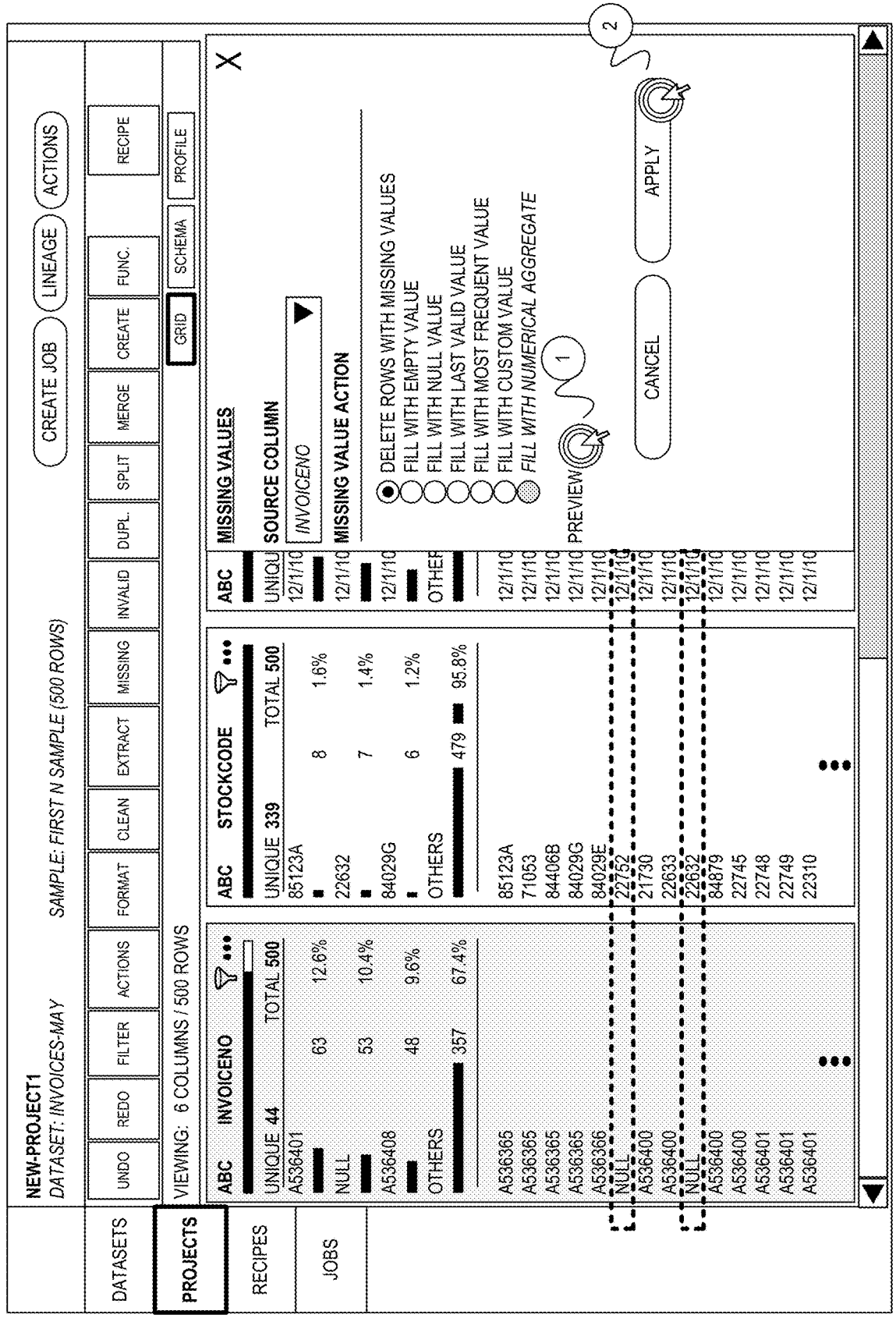
FIG. 7 is a diagram illustrating an exemplary user interface including an information panel provided by an interactive visual data preparation service for allowing a user to apply a transformation and view sample dataset responsive changes according to some embodiments.
Figure 8:
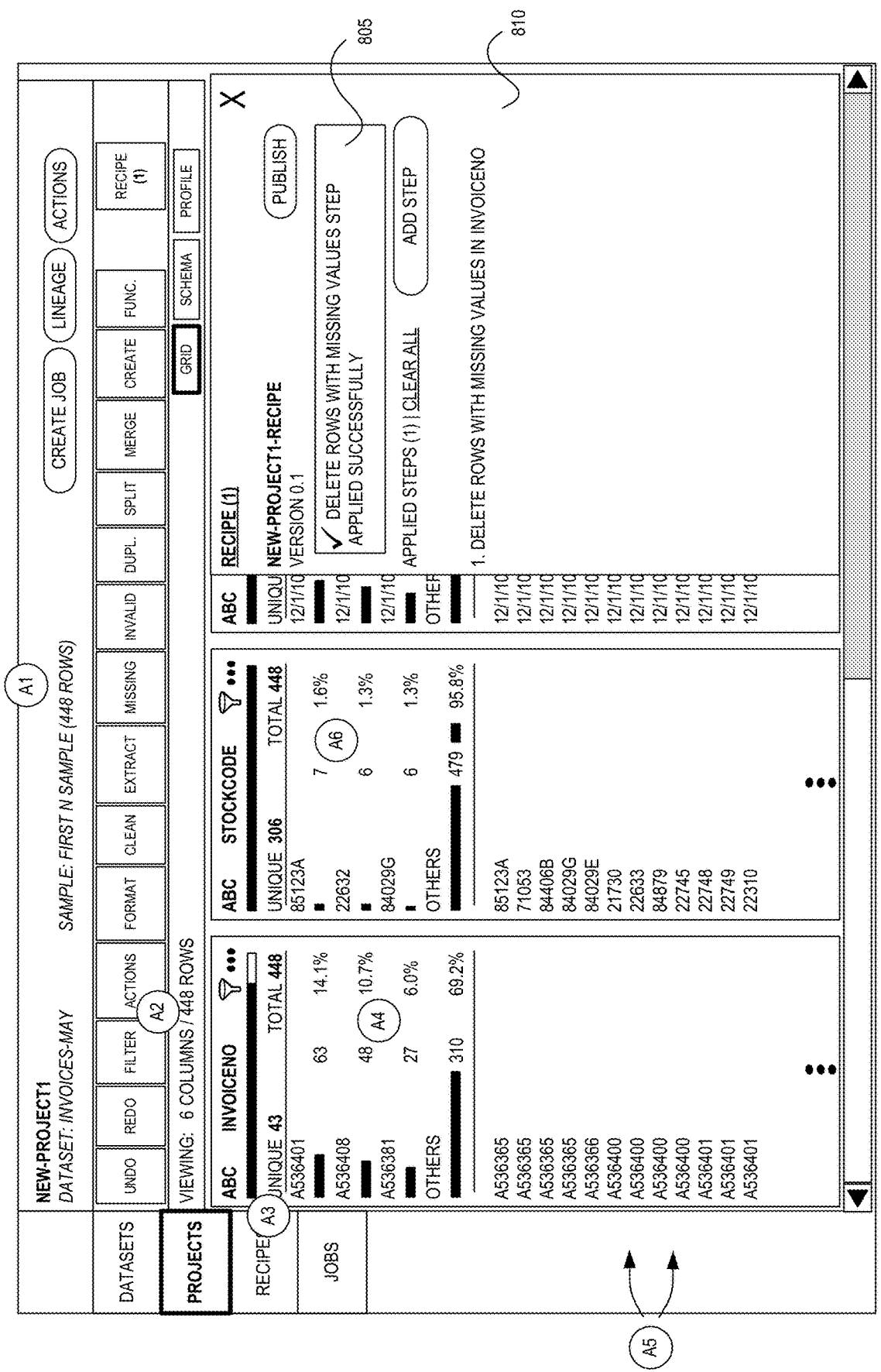
FIG. 8 is a diagram illustrating an exemplary user interface including an information panel provided by an interactive visual data preparation service showing a recipe step for a recipe with an updated sample dataset according to some embodiments.

In this scenario, we assume that the user, at circle (3) selects one of these transformations, thus seeking to delete any rows from the sample dataset that have a missing value in this "INVOICENO" column. In response, the information panel may change to allow the user to further configure (e.g., by providing parameters for the transformation) the transformation, as shown in FIG. 7. In this case, the user confirms the source column to be checked for missing values, confirms the action (deleting any rows from the entire sample dataset where that column has a missing value), may optionally select "preview" at circle (1) to show what effect the transform will have (where this effect may be determined on the user's computing device itself, or by sending a request to the VDP service 102, and thus to the processing node 160A, to perform the transformation and return the updated response). Thereafter, at circle (2), by selecting "apply" the computing device of the user may send a command to add a recipe step corresponding to this transformation to the VDP service 102, which may update its recipe object and/or set of recipe steps accordingly, and cause the processing node 160A to apply that transformation and return an updated display to the user. The result is shown in FIG. 8, which includes a number of updated values shown in the interface—a new number of rows in the sample dataset shown at circle (A1) and at (A2), new statistical/profile information associated with the selected column due to the deletions at circles (A3) and (A4), fewer rows existing as shown at circle (A5), and similar changes for the other, non-targeted columns such as at circle (A6).

Further, the information panel is updated to show the current state of the recipe object—detailing the name of the recipe ("NEW-PROJECT1-RECIPE", either autogenerated or provided at an earlier stage by the user), a version identifier, a confirmation dialog 805 indicating that the rows were deleted, and a set of recipe steps 810—currently, just one for deleting rows that have a missing value in the INVOICENO column.

Figure 9:
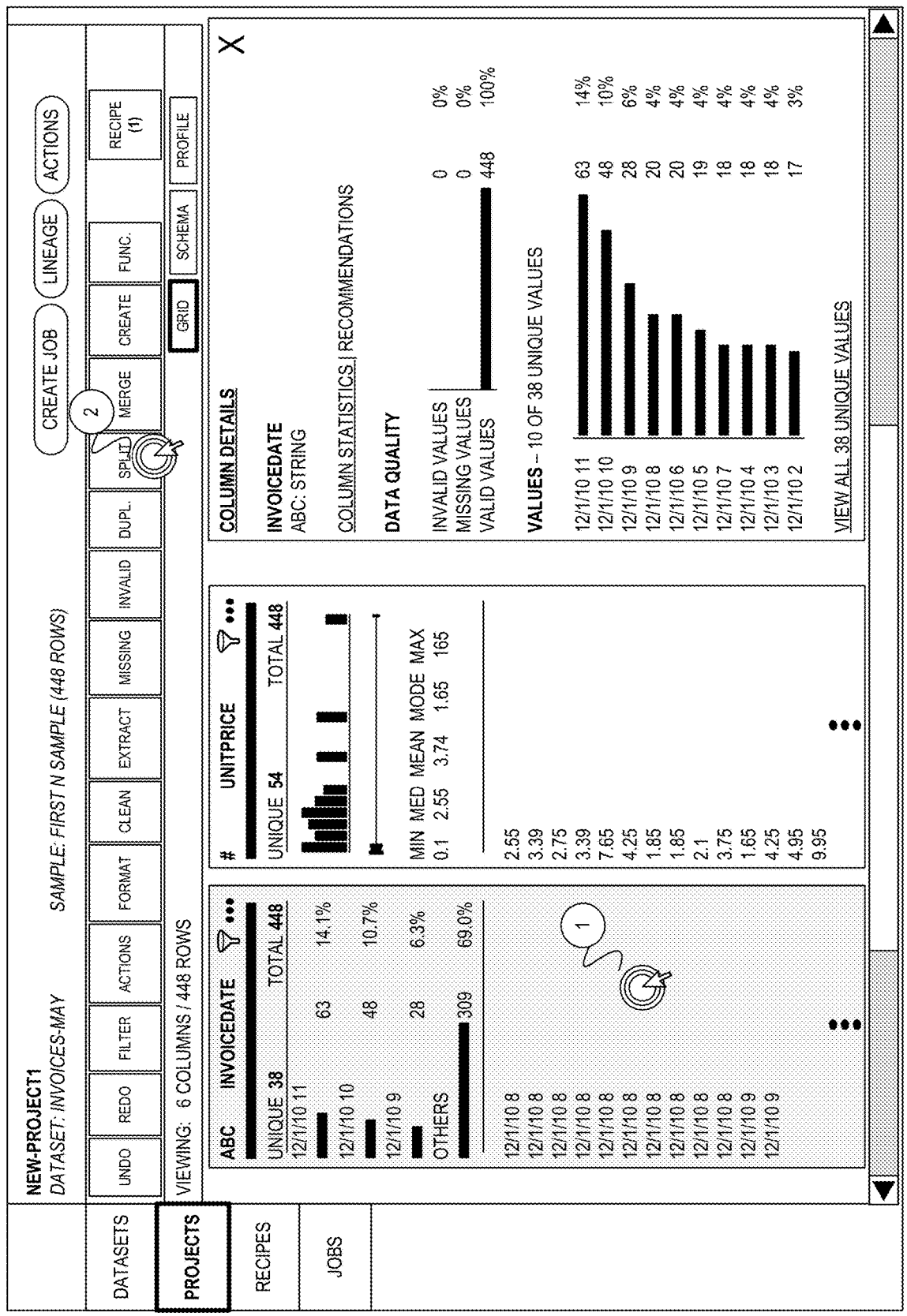
FIG. 9 is a diagram illustrating an exemplary user interface including an information panel provided by an interactive visual data preparation service showing a columnar data summary information for a user-selected column according to some embodiments.

The user may then continue working with the sample dataset to prepare it for their use case. For example, FIG. 9 is a diagram illustrating an exemplary user interface including an information panel provided by an interactive visual data preparation service showing a recipe step for a recipe with an updated sample dataset according to some embodiments. In this example, the user may be examining an INVOICEDATE column having textual values that appear to be datetime strings and may select the column at circle (1) to cause the information panel to provide additional information, as shown.

Figure 10:
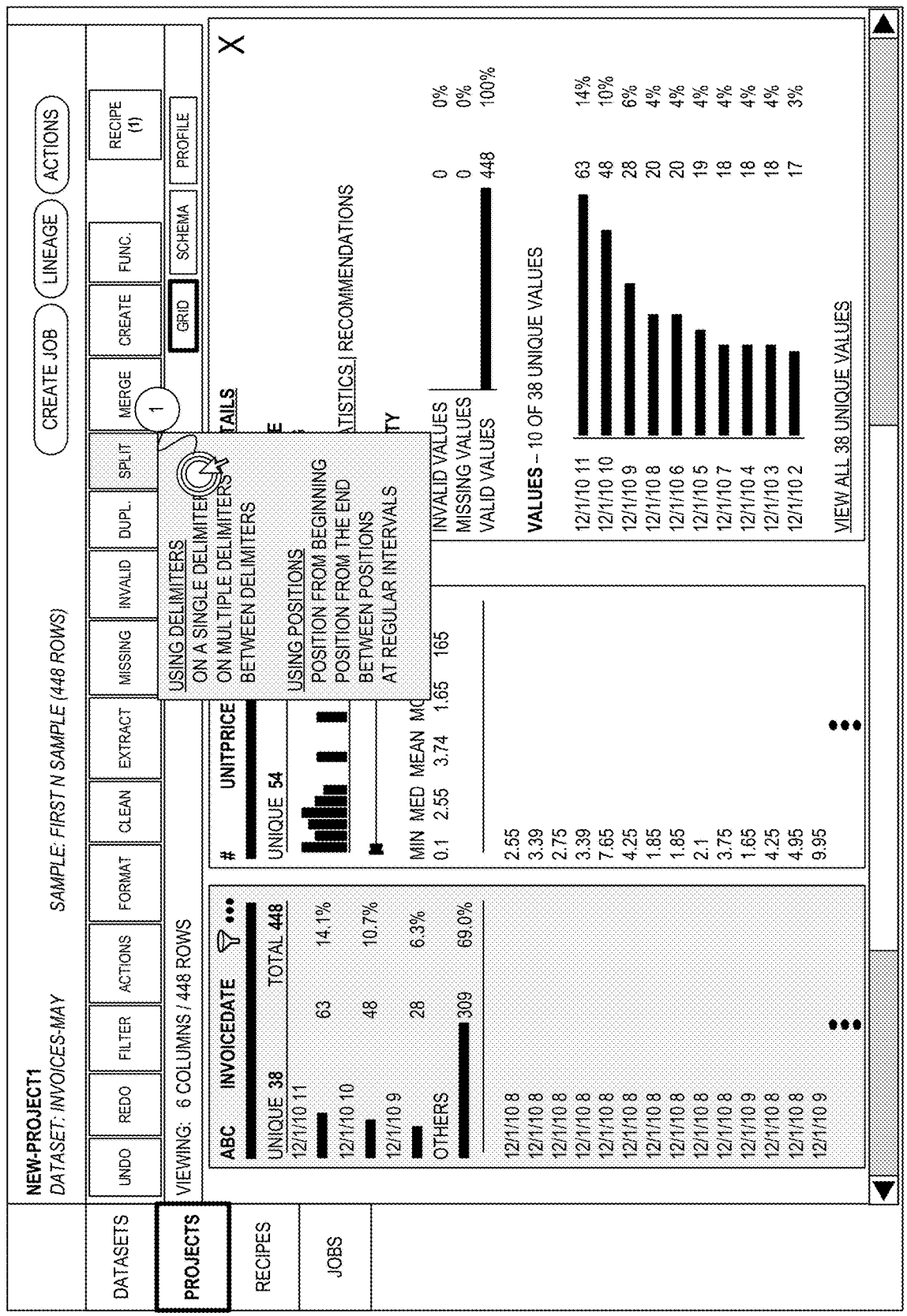
FIG. 10 is a diagram illustrating an exemplary user interface showing a transformation selection panel provided by an interactive visual data preparation service according to some embodiments.

In this example, the user may wish to convert this column into two columns—one indicating the date, and one indicating the time (e.g., in terms of an hour of the day). Thus, the user may select a split icon at circle (2). Continuing to FIG. 10, the user may be presented a drop-down user interface element allowing the user to select a "split" type transform—here, at circle (1), the user wishes to perform a transformation to split the column (into two columns) using a single delimiter.

Figure 11:
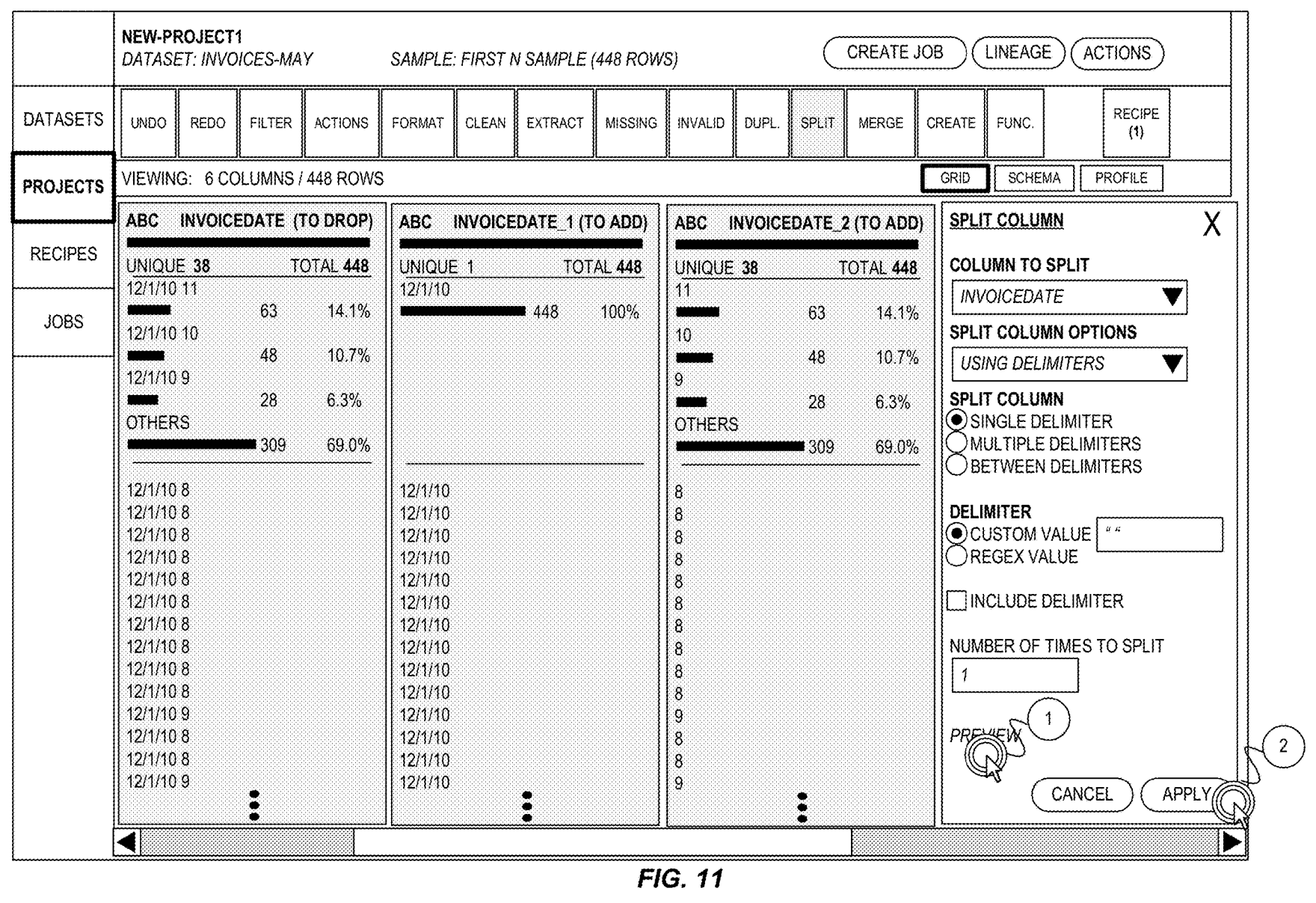
Figure 12:
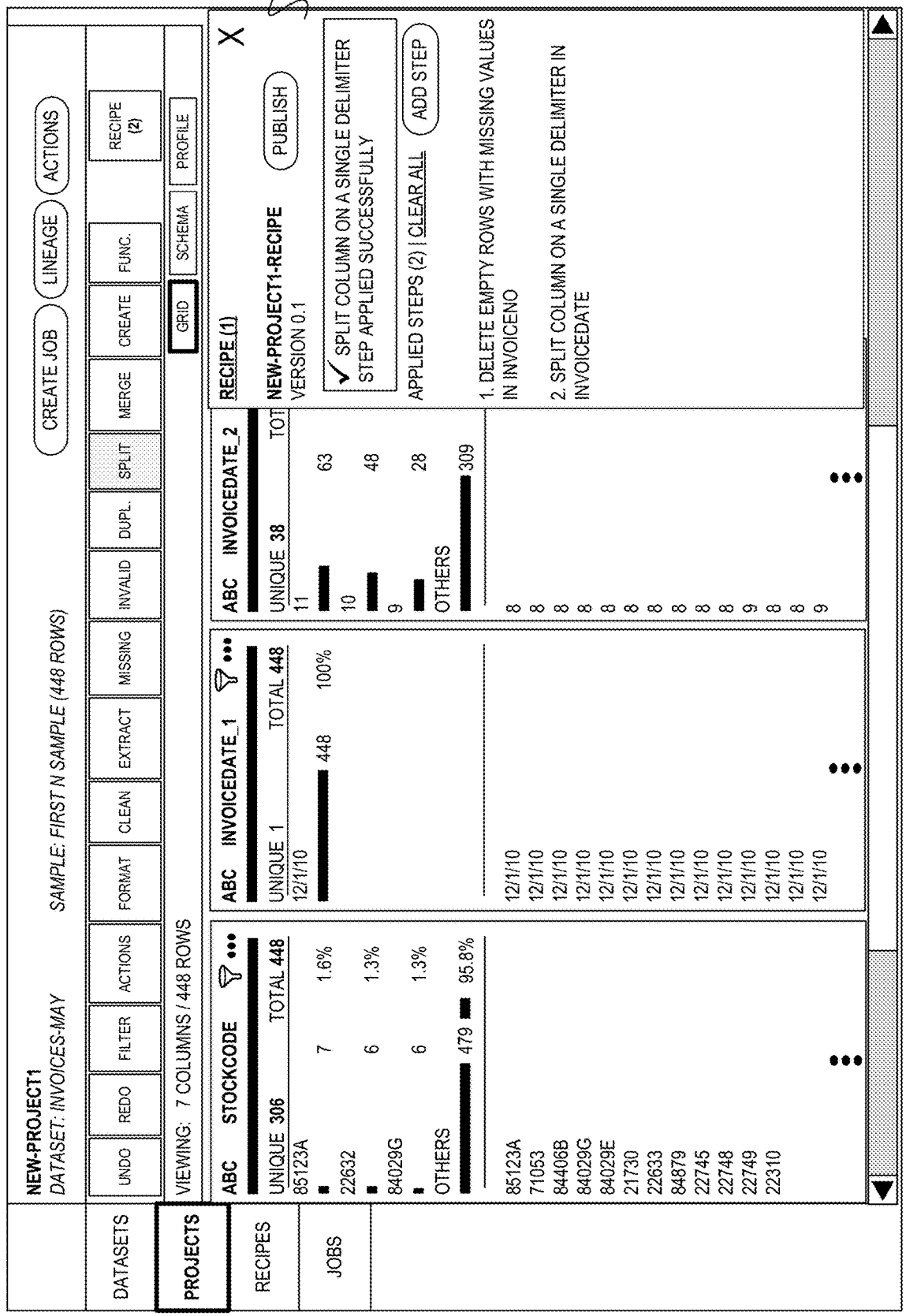
FIG. 12 is a diagram illustrating an exemplary user interface showing the updated sample dataset resulting from a user-selected split transformation and an updated recipe with two recipe steps according to some embodiments.

In FIG. 11, the information panel is again updated to allow the user to configure the transform with any necessary parameters—here, confirming the column to split, what splitting option to use (delimiters), how to perform the split (single delimiter, using a custom value of an empty space represented here as a blank space between two quotation marks, and performing only one split). In selecting the preview element at circle (1), two new columns are shown that reveal the result of the split—one column with dates, and another with the hour of day value. Again, in some embodiments, this preview may be entirely generated on the user's computing device using code referenced by the console, though in other embodiments this results from the user's device sending a create recipe step (or update recipe) call to the VDP service 102, which performs the transformation using the processing node 160A and returns the result thereafter. Upon seeing that the transformation is acceptable, the user may select the "apply" user interface element at circle (2) and, in FIG. 12, the display is updated (e.g., to remove the source column, update the total number of columns, including the new columns, etc.) and the recipe is similarly updated with a second recipe step as shown at circle (1).

Figure 13:
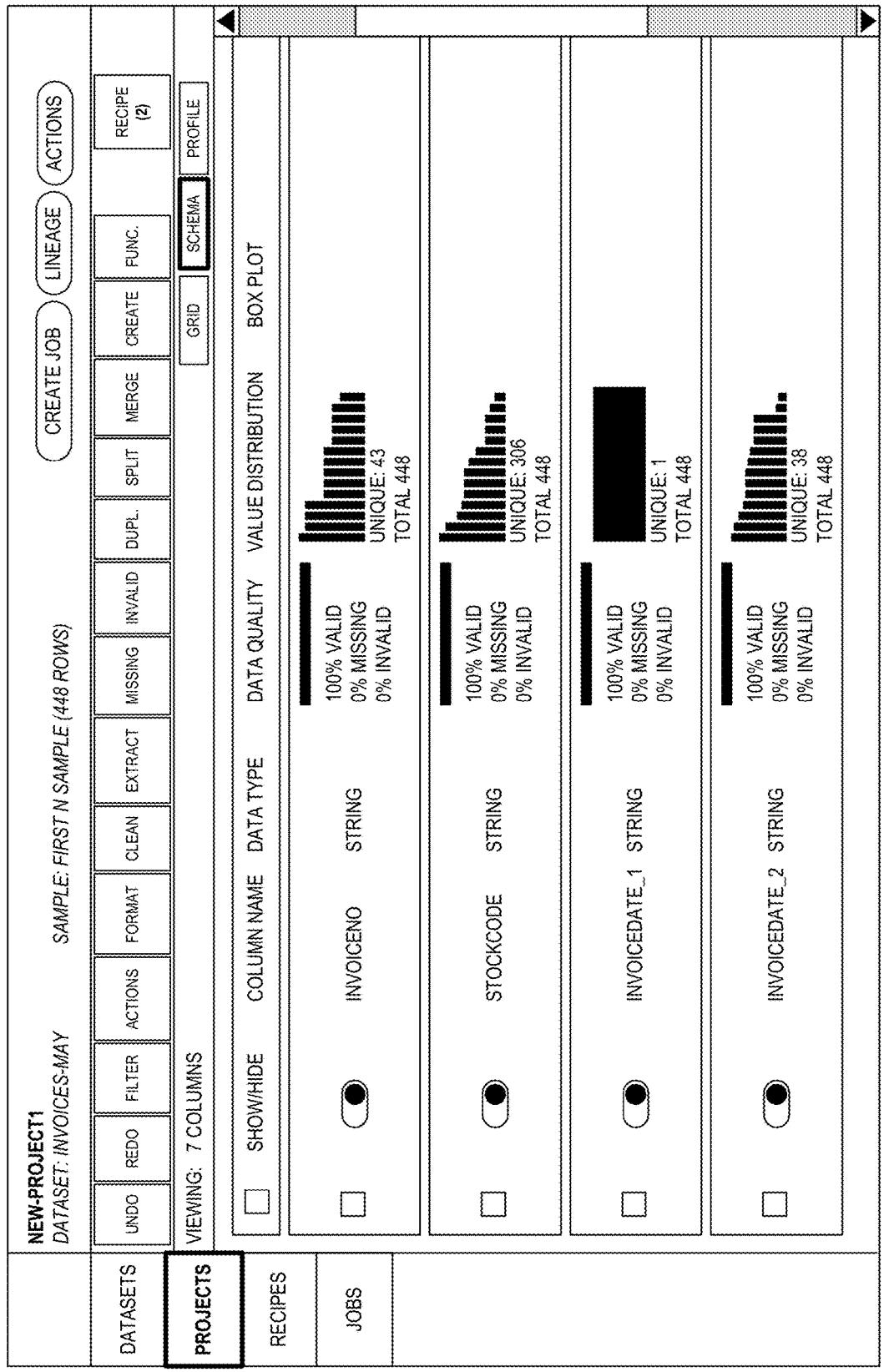
FIG. 13 is a diagram illustrating an exemplary user interface showing a schema view according to some embodiments.

The user may also interact with the sample dataset using the schema view, which may be selected by one of the "view" user interface elements (here, labeled "schema"). FIG. 13 is a diagram illustrating an exemplary user interface showing a schema view according to some embodiments. In this view, the user may view statistical information about the sample dataset with directly viewing the data values; thus, as shown, the user may view the inferred datatypes, column names, data quality metrics, value distributions, box plots, etc., associated with the sample.

In some embodiments, the user may also "switch" the sample during the interactive recipe creation process. For example, in some user interfaces (such as the one shown in FIG. 13) a user interface element (e.g., a hyperlink for the text "SAMPLE: FIRST N SAMPLE") may be presented that allows a user to select it to change the type/size of sampling, request a new sample, and/or create a sample including the entire dataset. In response, the VDP service can re-sample accordingly as described herein, perform any recipe steps and/or profiling, and present the updated results to the user to allow the user to further gain confidence in their understanding of the content of the dataset and/or to verify that their crafted recipe works against other data from the dataset.

Additionally, or alternatively, this or other user interfaces disclosed herein may allow the user to view both, at a same time or one at a time, the statistical/profile data generated based on the sample of the dataset along with the same type of statistical/profile data generated based on the entire dataset. This can also allow users to further gain confidence in their understanding of the content of the dataset, e.g., that they have a clear understanding of the types or content of the values present therein, the range(s) of values, etc., allowing for the user to potentially fine-tune or change their recipe if they discover issues that they did not contemplate simply based on their analysis involving the sample.

Figure 14:
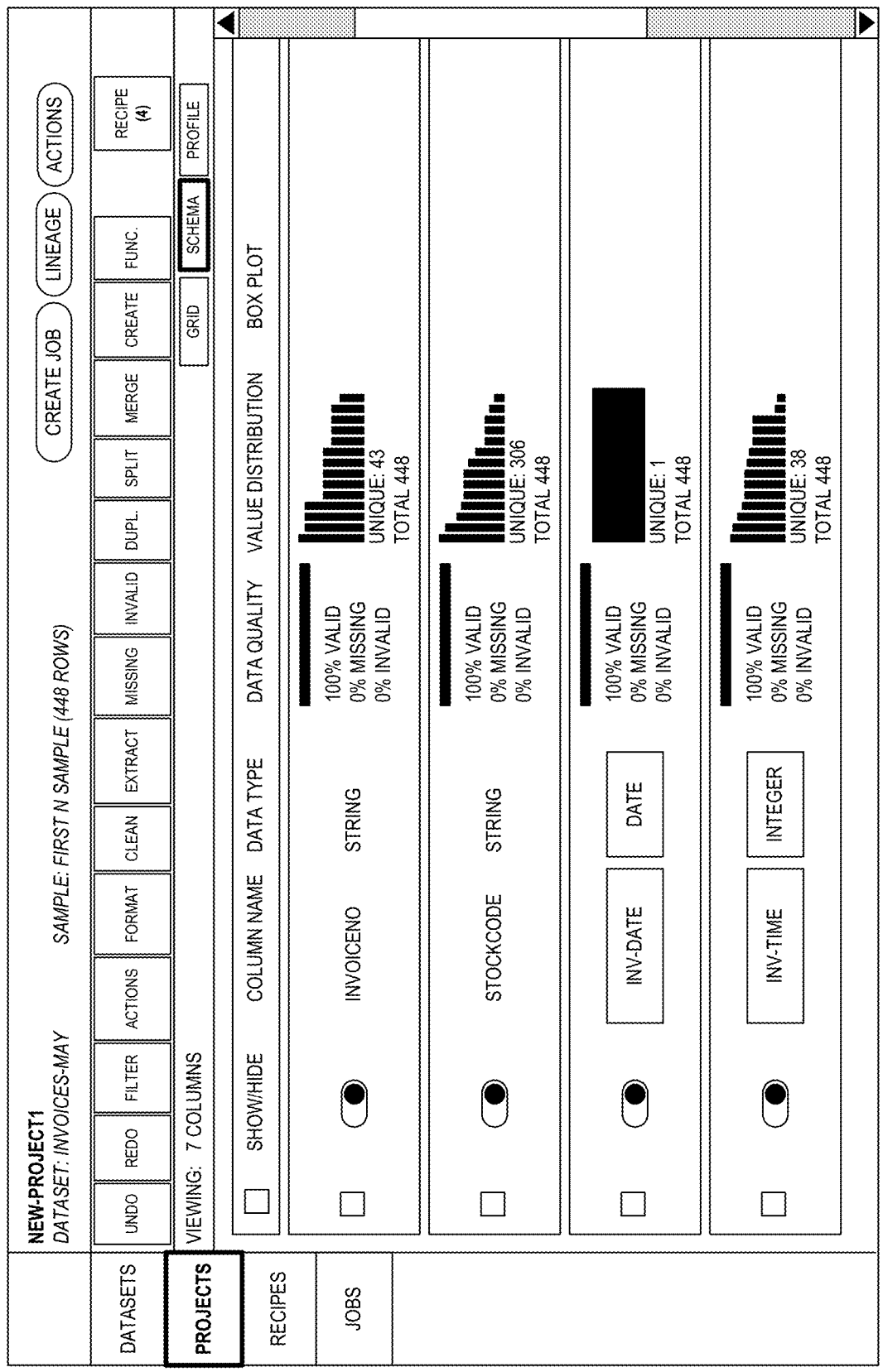
FIG. 14 is a diagram illustrating an exemplary user interface showing a schema view with user-modified column names according to some embodiments.

The user may also configure transformations via this view. For example, FIG. 14 is a diagram illustrating an exemplary user interface showing a schema view with user-modified column names according to some embodiments. In this example, the user may seek to change the names of ones of the columns—here, by changing an autogenerated column name (via a previous transformation) from INVOICE-DATE_1 to INV-DATE, and an autogenerated column name from INVOICEDATE_2 to INV-TIME. This again may result in the user's computing device sending a request to create one or more recipe steps (or, in some embodiments, update a recipe object) to include recipe steps for changing these column names. Similarly, the user may seek to change the datatypes of ones of the columns—here, by changing the INV-DATE column to be of type 'DATE' and the INV-TIME column to be of type 'INTEGER'. This again may result in the user's computing device sending one or more requests to create one or more recipe steps (or, in some embodiments, update a recipe object) to include recipe steps for changing these column data types. Further, in some embodiments a same request may be sent to perform multiple ones of these transformations (e.g., identifying both column name changes and column datatype changes), which may be received by the VDP service and translated into multiple recipe steps.

Figure 15:
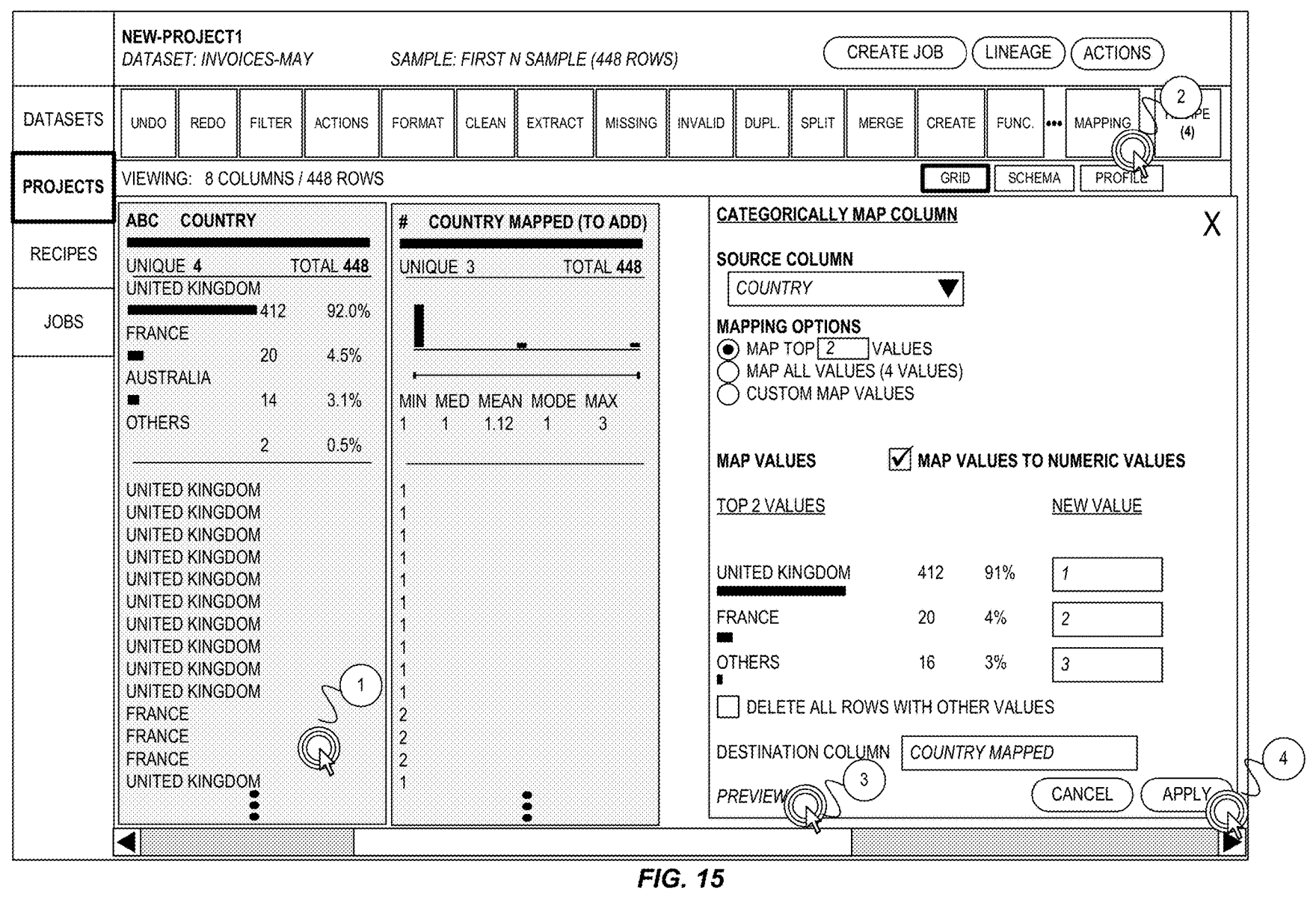

Another example of a transformation is shown in FIG. 15, which is a diagram illustrating an exemplary user interface showing a proposed new column created by a user-selected mapping transformation according to some embodiments. In this example, the user wishes to add a recipe step for transforming the values into a mapped set of categories, which may be more useful for machine learning purposes. Thus, the user selected a "COUNTRY" column in the sample dataset at circle (1), selected the mapping button in the toolbar at circle (2), and configured the transformation and associated parameters in the panel.

Figure 16:
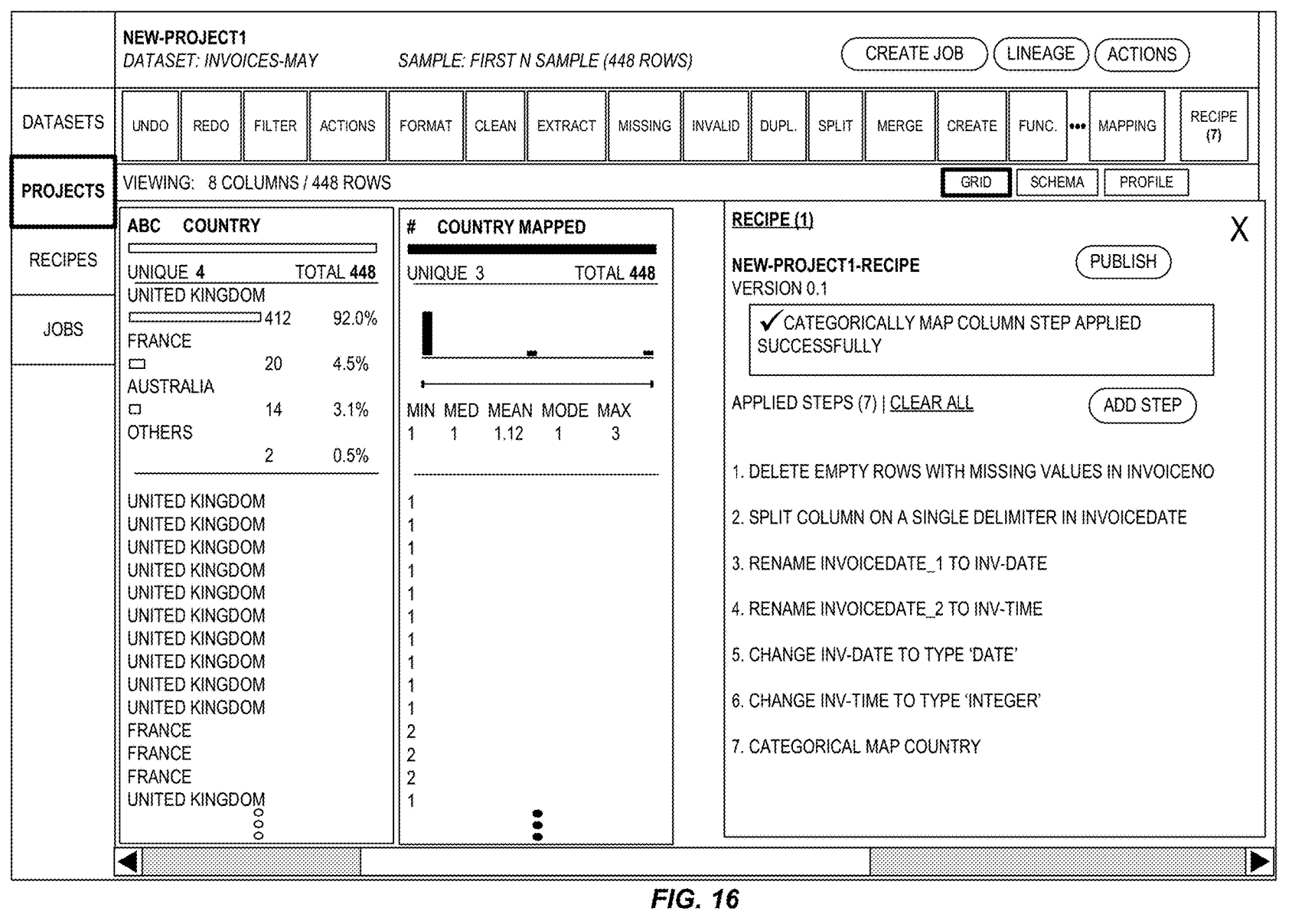

In this example, the user indicates that the column COUNTRY is the source column, the top two values in that column are to be remapped (to numeric values '1' and '2', per the checkbox, along with a catch-all value of '3' for other values) to another destination column called COUNTRY MAPPED. Upon selecting preview at circle (3), the user interface is updated to show the change that will occur, and upon selecting the apply user interface element at circle (4) the result and the updated recipe is shown in FIG. 16, which has seven recipe steps.

Figure 17:
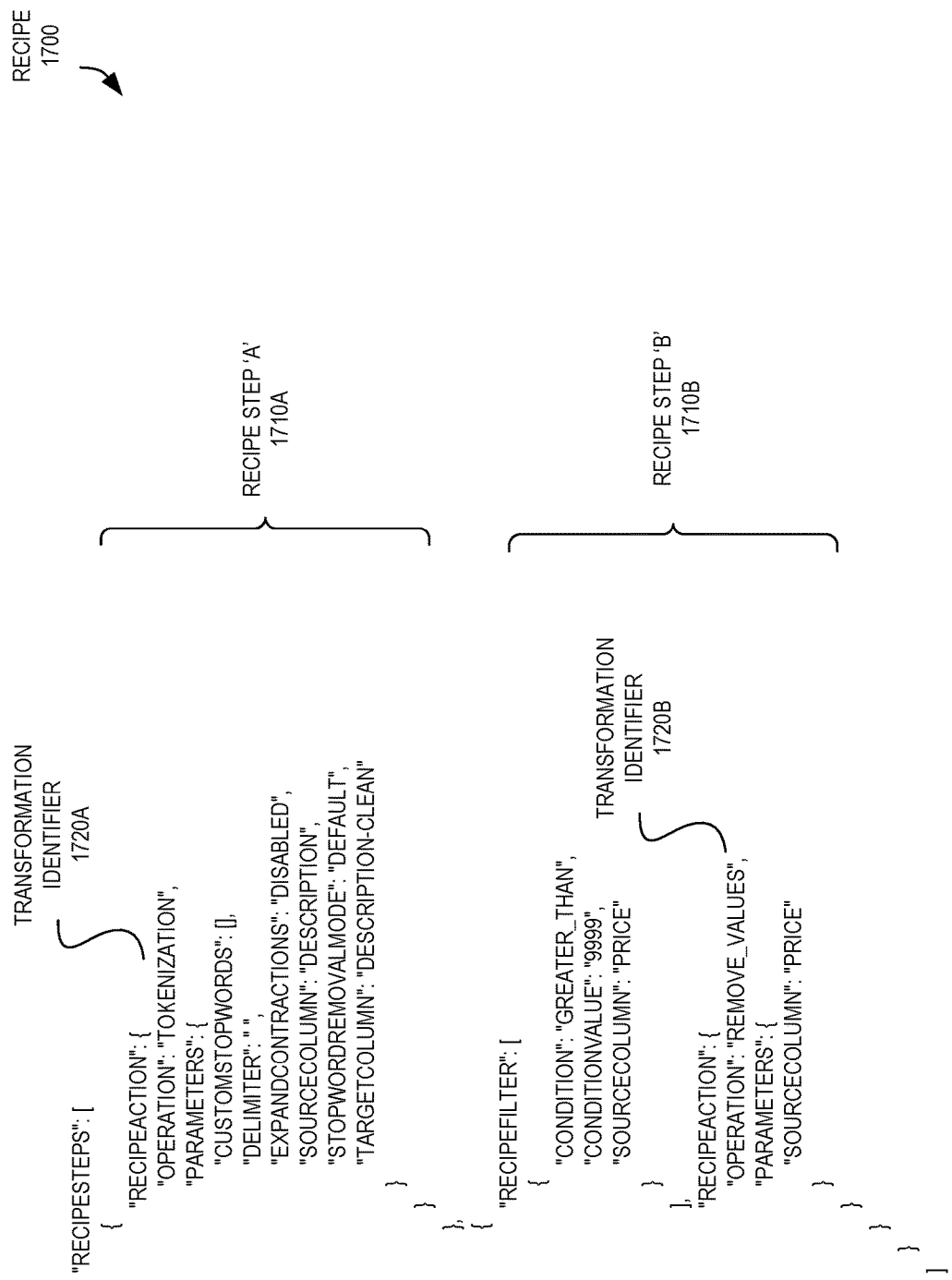
FIG. 17 is a diagram illustrating an exemplary object representation of a recipe with multiple recipe steps according to some embodiments.

As indicated herein, a recipe object may include—or otherwise be associated with—one or more recipe steps. Such an object may be represented as structured text, such as that shown in FIG. 17. FIG. 17 is a diagram illustrating an exemplary object representation of a recipe with multiple recipe steps according to some embodiments. In this example object, which may be passed between the user's computing device and the VDP service 102 or generated and stored by the VDP service 102 itself, the recipe 1700 is made up of a set of recipe steps. In this example, a first recipe step 'A' 1710A is represented with a RECIPEACTION block for an operation of "tokenization" (transformation identifier 1720A) and a set of parameters corresponding to that transformation—here, indicating that the source column is DESCRIPTION, that contraction expansion is disabled, the target column is DESCRIPTION-CLEAN, etc.

A next recipe step 'B' 1710B includes both a filter (e.g., a set of one or more conditional logic expressions for matching particular values, indicating which records the action is to be applied to) and an associated recipe action with an operation (transformation identifier 1720B) of remove values and a parameter of the source column—PRICE. Here, the "recipe filter" conditional expression is evaluated to identify what rows to act on—here, finding rows with a value (in the column PRICE) that is greater than 9999. Then, the operation of removing those values is performed on any matching rows.

When a recipe has been sufficiently finalized by a user, the user may move to a job creation user interface, either by selecting a user interface element (such as a 'create job' button shown in interfaces throughout the figures), by selecting a 'jobs' navigation button, or other means. FIG. 18 is a diagram illustrating an exemplary user interface provided by an interactive visual data preparation service for data preparation job creation based on recipes according to some embodiments. The user may use such a user interface to define a job to be performed using the recipe. The job may be immediately run, run according to a schedule or responsive to a particular type of event, etc. For example, the user may specify a job name, the associated dataset to use as the source data (here, reflected as INVOICES-MAY, though this can also utilize a wildcard or a storage location, and thus a particular non-directly specified input dataset or datasets may be selected to allow for continual processing of new data), the associated recipe (here, the recipe named NEW-PROJECT1-RECIPE), job output settings (e.g., a storage location for the transformed dataset, a file type, whether compression is be used, whether the output data is to be encrypted (e.g., using a key associated with the user), etc.), and other configuration values that may be relevant, such as scheduling information (e.g., one-time immediate execution, scheduled execution, periodic execution, etc.), tags, or the like.

Upon selecting the create and run job user interface element, the user's computing device may send a CreateRecipeJob API call to the VDP service 102, which can store a representation of the job and cause the job to be executed as dictated by the job—e.g., immediately, one time a day, when a particular type of event is detected, or the like.

The job may be executed by a same processing node (e.g., processing node 160A) or different processing node (e.g., processing node 160B) as used during the interactive recipe creation, or may be executed by a completely different service, such as a big data analysis service that specializes in running these sorts of jobs. Thereafter, the user may view the status of the job (and other jobs) in a job run history user interface such as that illustrated in FIG. 19. In this interface, a user may see a list of jobs that the user has permission to view, including an identifier of the job run, a status of the run (e.g., success, failure, processing), a run time for the job, a link to the output of the job, a summary of the job, an identifier of the user that started the job, etc.

Figure 20:
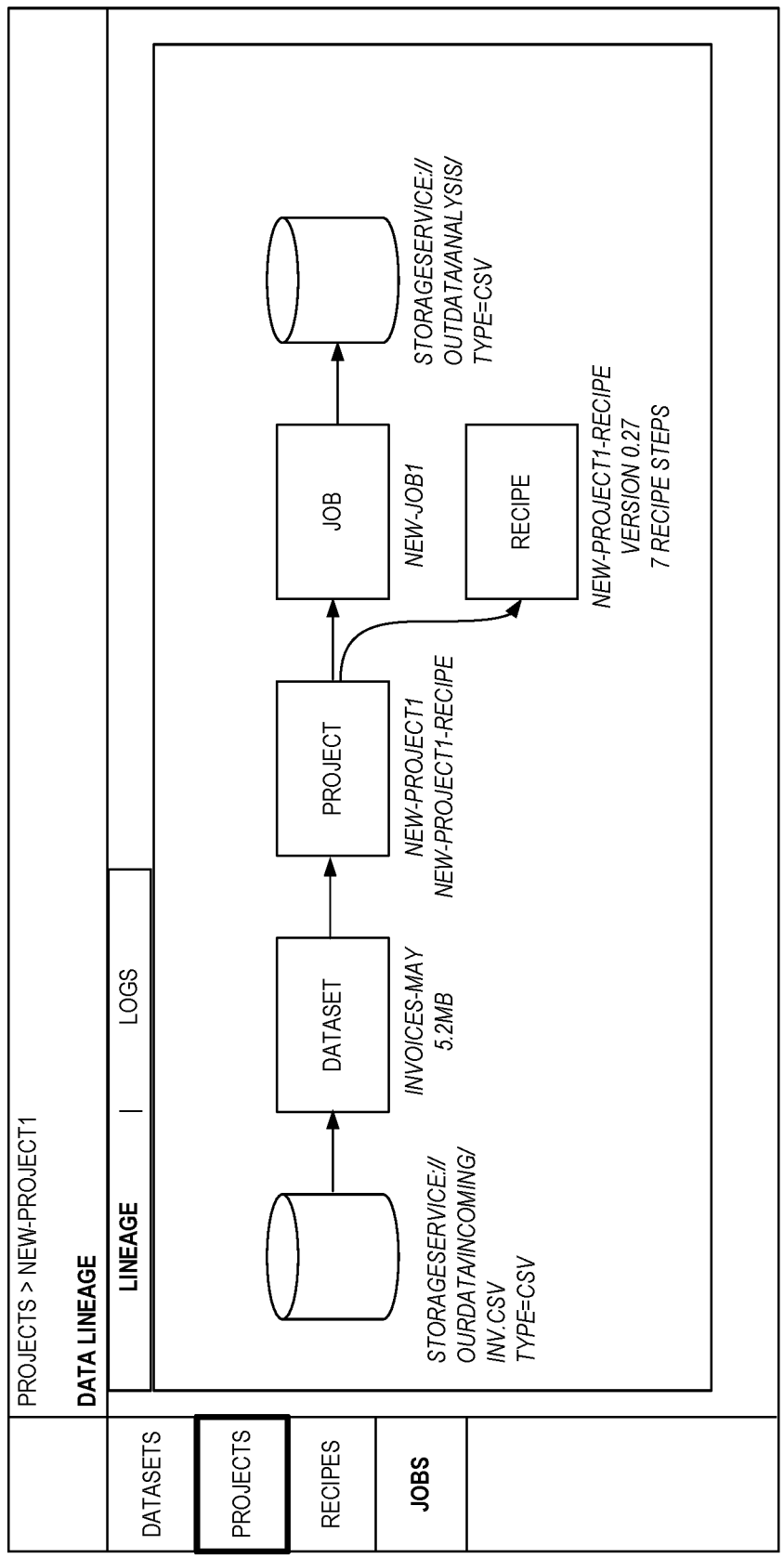
FIG. 20 is a diagram illustrating an exemplary user interface provided by an interactive visual data preparation service for viewing data lineage information according to some embodiments.

A user may also view the data lineage of the project, recipe, and/or involved datasets. This can be particularly helpful when recipes are shared with other users. Because recipes themselves are not directly tied to a specific source dataset, other users may use a recipe with their own dataset(s), and this history may be presented to the user. For example, FIG. 20 is a diagram illustrating an exemplary user interface provided by an interactive visual data preparation service for viewing data lineage information according to some embodiments. This view can allow users to see and explore the different versions of the projects and/or recipes that have been created, the different job runs that resulted, etc. In this example, a source dataset is shown as being used to form a dataset object ("INVOICES-MAY") that is part of a project ("NEW-PROJECT1") that was run as NEW-JOB1 and yielded a particular output dataset; moreover, a new version 0.2 of the recipe was created based on the project that includes seven recipe steps.

Figure 21:
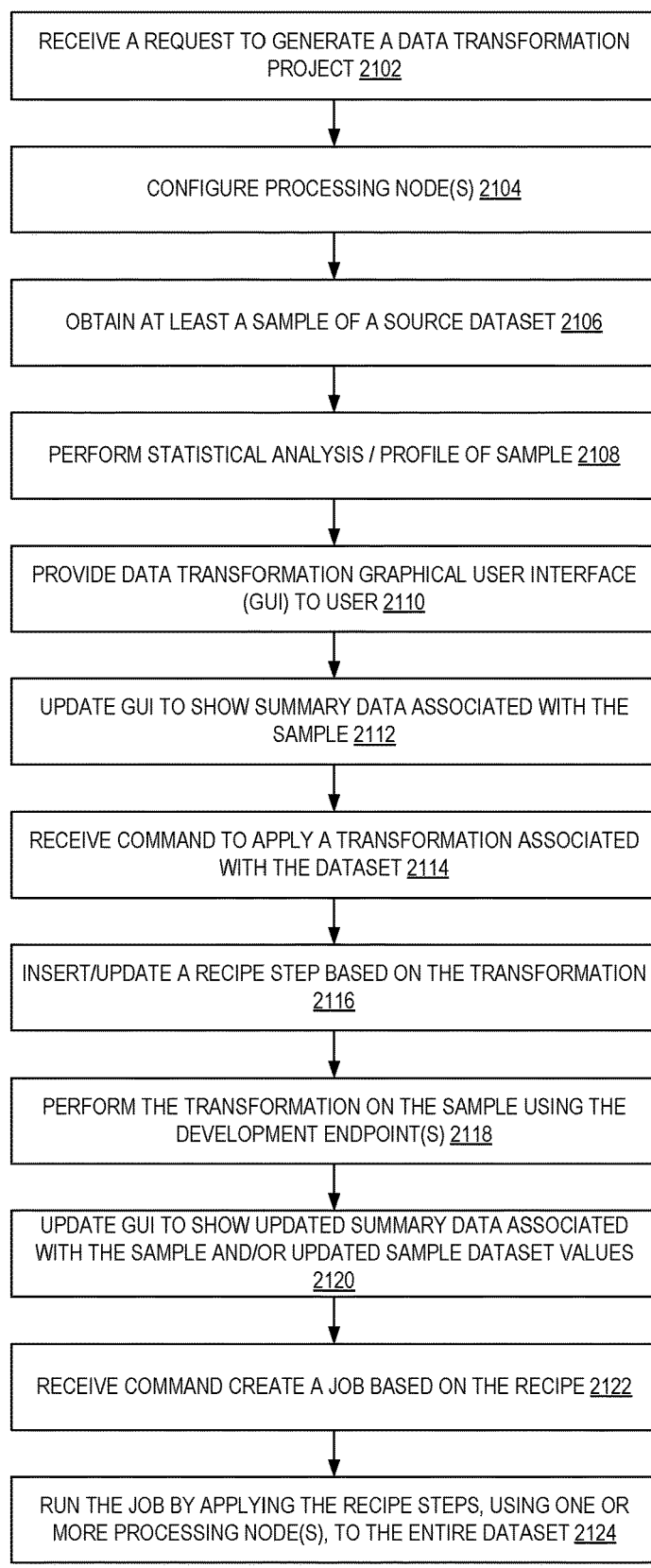
FIG. 21 is a flow diagram illustrating operations of a method for simplified visual data preparation according to some embodiments.

FIG. 21 is a flow diagram illustrating operations 2100 of a method for simplified visual data preparation according to some embodiments. Some or all of the operations 2100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 2100 are performed by the VDP service 102 of the other figures.

The operations 2100 include, at block 2102, receiving a request to generate a data transformation project. The request may be received responsive to a user using a set of user interfaces, presented by the user's computing device, to initiate a data preparation project. The request may identify a source dataset, which may exist within a storage service (e.g., of a provider network), be provided with the request via an upload, or be an identifier to a data catalog maintained by a separate system such as a managed ETL service, which itself references a separate dataset. The dataset may be stored in one of a variety of different formats, such as in one or more spreadsheet files, comma-separated values (CSV) or tab-separated values (TSV) files, in a special-purpose file format (e.g., Parquet), in a database or other data structure, etc. The source dataset may include many records, which may correspond to rows of a table-like structure. The source dataset may have the records organized in a row-based or column-based format, and thus each record may include one or more values corresponding to one or more columns (or attributes), which may include names or identifiers thereof (e.g., a first row may include column labels). The source dataset may have been previously registered (e.g., by the user's computing device) via another request that identifies the dataset, provides a name for the dataset, and the like.

The operations 2100 further include, at block 2104, configuring a processing node. The processing node may comprise an instance (e.g., virtual machine or container) that is reachable via a network (and thus serves as, or otherwise utilizes, a network endpoint) that executes analytics-type software, such as an analytics engine like Apache Spark or the like. Configuring the processing node may thus include acquiring or launching the instance (e.g., based on an image or set of instructions to launch it with the particular analytics package) and, e.g., providing it project-related information such as an identifier of to-be-utilized source dataset(s), an identifier of security credentials to be used to access the source dataset(s), information identifying how to sample from the source dataset (e.g., a number of rows, an access pattern), etc.

The operations 2100 further include, at block 2106, obtaining at least a sample from a source dataset. In some embodiments block 2106 includes requesting and receiving the entire source dataset (e.g., from a storage service) and then filtering out (e.g., deleting or otherwise ignoring) records from the source dataset to yield a sampled dataset. In some embodiments block 2106 includes requesting and receiving only a sampled dataset, e.g., by requesting only a particular amount of the source dataset.

At block 2108, the operations 2100 further include performing a statistical analysis/profile of the sample dataset. In some embodiments, block 2108 also includes performing a statistical analysis/profile of the entire source dataset. The resulting data may include statistical information (e.g., a number of rows in the dataset, a number of columns in the dataset, a distribution of values in a particular column, a cardinality of values in a particular column, a minimum, maximum, mean, median, range, etc., of values in a column), an inferred datatype of a column, a set of column names, etc. The profiling also includes, in some embodiments, determining a recommended set of one or more transformations, for one or more of the columns, based on logic such as a set of heuristics or rules, use of a machine learning technique, or the like, to identify transformations that may be useful (e.g., due to observed prior use of the transformations on similar datasets or portions thereof) for the user.

At block 2110, the operations 2100 further include providing a data transformation graphical user interface (GUI) to user. The GUI may include a portion that presents values of the dataset to the user (e.g., broken up according to columns), a portion that presents column-specific statistical or profile information to the user, a portion that presents overall dataset (sample dataset or source dataset) statistical or profile information to the user, and/or a set of user interface elements (e.g., a toolbar of icons) allowing the user to test out transformations on some or all of the sample dataset.

The operations 2100 include, at block 2112, updating the GUI to show summary data associated with the sample. The GUI, in some embodiments, is provided to the user initially and when the statistical analysis/profiling is complete, this data may be provided back to the computing device to cause it to update the GUI.

In some embodiments, the user may thus use the GUI to interact with the dataset, view the statistics or profile information, and test out transformations to be applied to the dataset to yield a desired format. Accordingly, the operations 2100 further include, at block 2114, receiving a command to apply a transformation associated with the dataset. The command may be carried by an API call sent from the user's computing device to an endpoint associated with a VDP service executing in a provider network, which may have been sent responsive to the user selecting and configuring a particular transformation. The command may include an identifier of a requested transformation for a recipe (associated with the project) and optionally configuration parameters and/or selection criteria.

The operations 2100 further include, at block 2116, inserting or updating a recipe step based on the transformation. In some embodiments, a recipe object is updated in a data store to include different or additional portions thereof, e.g., different recipe step segments of the recipe object. In some embodiments, recipe steps may be separately stored and associated with the recipe (e.g., via inclusion of a recipe identifier in a record associated with the recipe step, though many other ways to associate different objects exist that are well-known to those of skill in the art).

At block 2118, the operations 2100 further include performing the transformation on the sample using the processing node(s). In some embodiments, block 2118 includes generating code or a command based on the requested transformation (and any parameters and/or selection criteria) and sending the code or command to the processing node to be executed. For example, in some embodiments the processing node was configured (e.g., per block 2104) to include a library of functions or modules corresponding to various transformations, and the code or command may be executed on the processing node to call those functions or modules, which may utilize an underlying analytics engine.

In some embodiments, an updated sample dataset (transformed based on the performing of the transformation) may be sent back the user's computing device, and at block 2120, the operations 2100 further include updating the GUI to show updated summary data associated with the sample and/or updated data values of the updated sample dataset. In this manner, the user may be presented near-immediate feedback clearly showing an example of how the transformation, as configured, affected actual values sampled from the source dataset, and thus the user may undo that transformation, reconfigure the transformation (if it didn't perform as expected), accept the transformation, etc. Thus, in some embodiments the user may further interact with the GUI to implement additional transformations, and thus an optional loop 2126 may be performed one or multiple more times.

The operations 2100 include, at block 2122, receiving a command create a job based on the recipe. The command may include an identifier of a recipe, an identifier of a source dataset (e.g., the same source dataset that the sample was obtained from), and information indicating when the job is to be run, e.g., one time, at a particular time or times, according to a schedule, or the like. The command may also include an identifier of an output location for the resulting transformed dataset is to be stored.

The operations 2100 further include, at block 2124, running the job by applying the recipe steps, using one or more processing node(s), to the entire dataset. The one or more processing node(s) may or may not be the same as the one(s) configured at block 2104—e.g., it may include using multiple processing nodes operating in a cluster. The running of the job may include generating code based on the recipe, and sending the code to one or more processing nodes, which may reference existing transformation functions (or transformation functions included in the sent code) and/or an underlying analytics engine.

Figure 22:
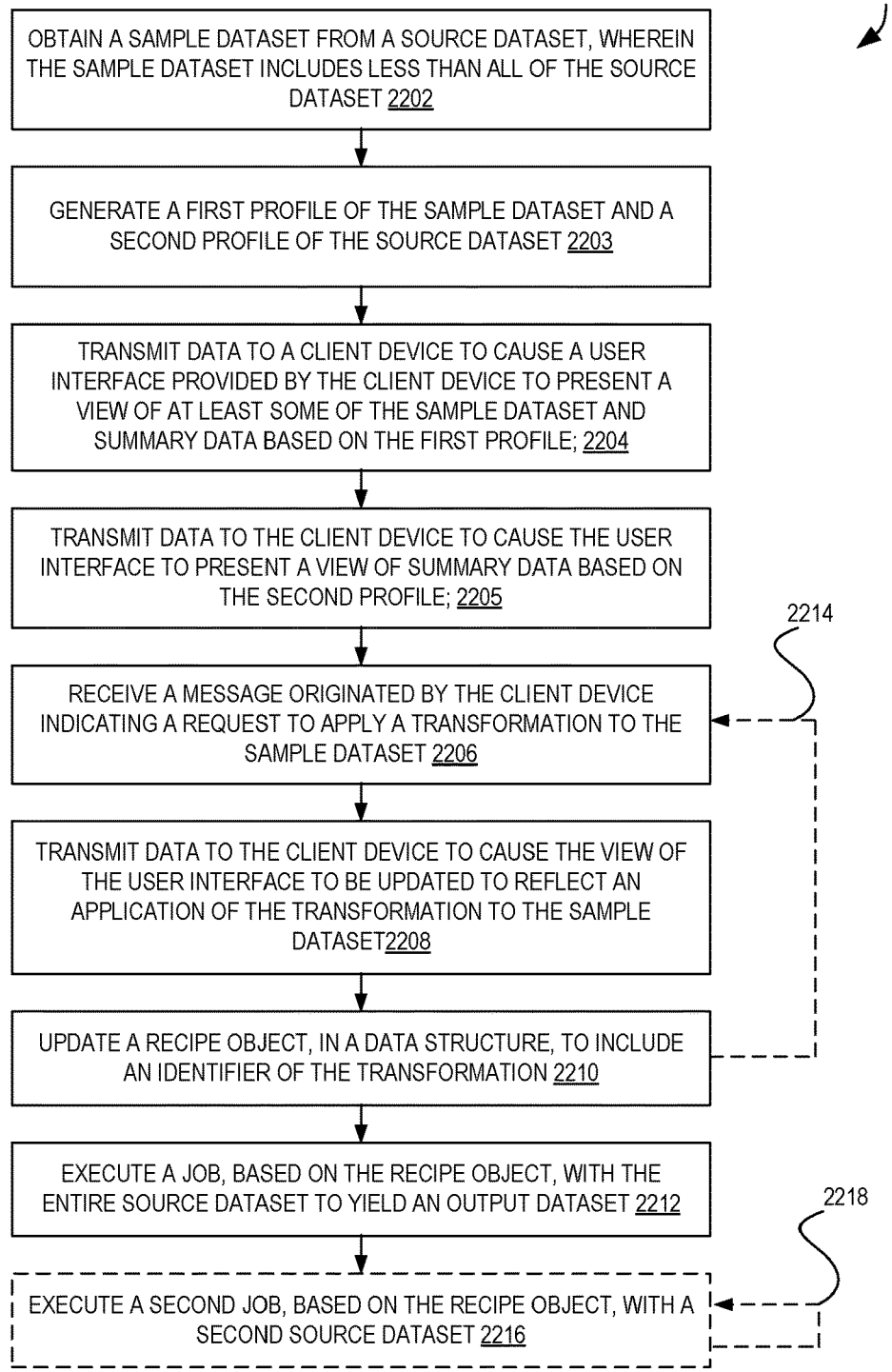
FIG. 22 is a flow diagram illustrating operations of a method for simplified visual data preparation according to some embodiments.

FIG. 22 is a flow diagram illustrating operations 2200 of a method for simplified visual data preparation according to some embodiments. Some or all of the operations 2200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 2200 are performed by the VDP service 102 of the other figures.

The operations 2200 include, at block 2202, obtaining a sample dataset from a source dataset, wherein the sample dataset includes less than all of the source dataset, and at block 2203, generating a first statistical profile of the sample dataset and a second statistical profile of the source dataset. The operations 2200 further include, at block 2204, transmitting data to a client device to cause a user interface provided by the client device to present a view of at least some of the sample dataset and summary data based the first profile; at block 2205, transmitting data to the client device to cause the user interface to present summary data based on the second profile; and at block 2206, receiving a message originated by the client device indicating a request to apply a transformation to the sample dataset.

The operations 2200 include, at block 2208, transmitting data to the client device to cause the view of the user interface to be updated to reflect an application of the transformation to the sample dataset. In some embodiments, the application of the transformation comprises modifying one or more values of a column of the sample dataset. In some embodiments, the application of the transformation comprises inserting one or more additional columns of values into the sample dataset based on values of an existing column of the sample dataset. In some embodiments, the application of the transformation comprises removing one or more rows of the sample dataset.

The operations 2200 further include, at block 2210, updating a recipe object, in a data structure, to include an identifier of the transformation; and at block 2212, executing a job, based on the recipe object, with the entire source dataset to yield an output dataset. The operations may continue, as shown by 2214, back to block 2206 one or more times.

In some embodiments, the operations 2200 further include block 2216 and executing a second job, based on the recipe object, with a second source dataset (e.g., identified based on a dataset identifier provided by a user). Block 2216 may be performed one or more times, as reflected by 2218, using the same recipe object with different source datasets.

Figure 23:
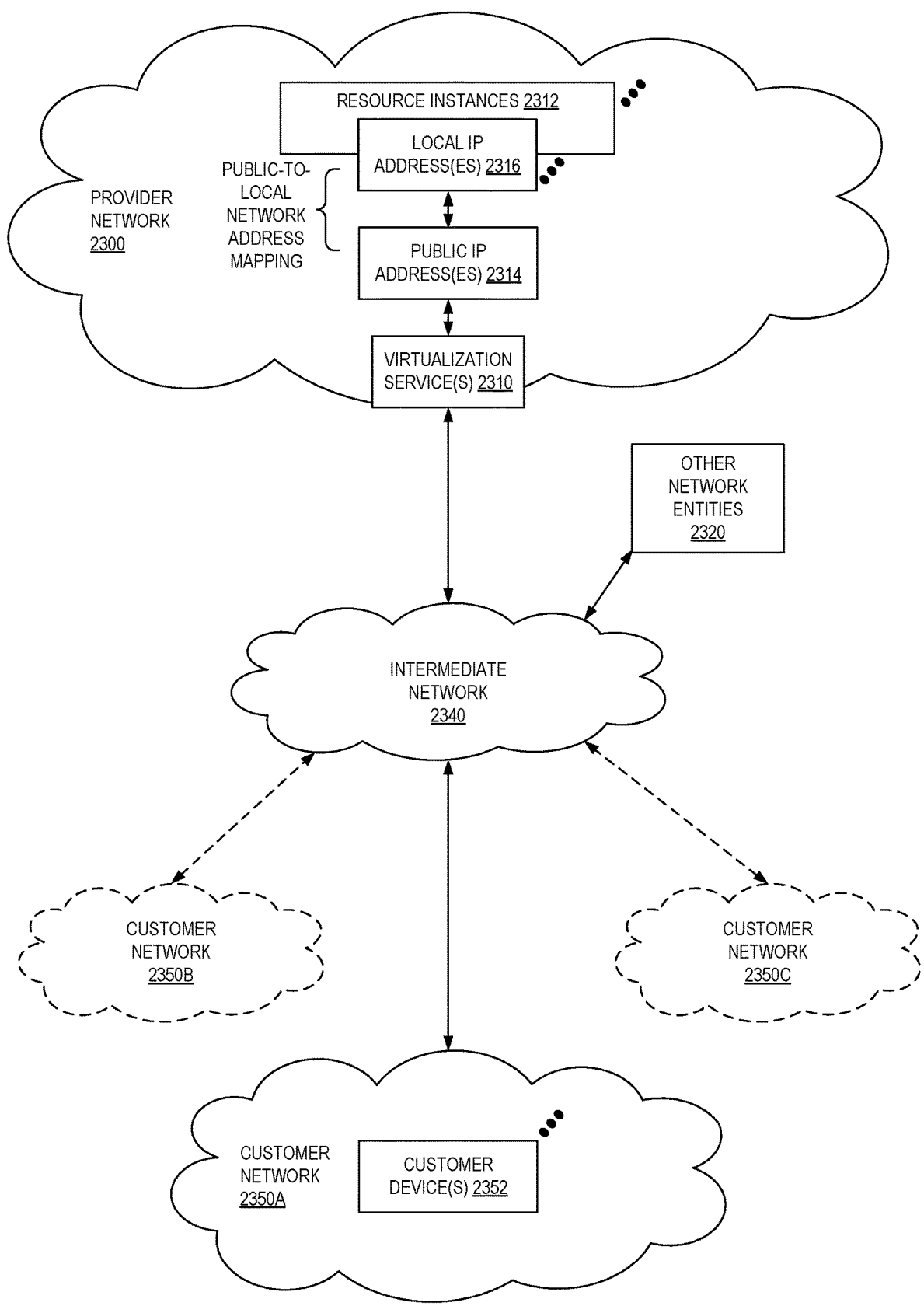
FIG. 23 illustrates an example provider network environment according to some embodiments.

FIG. 23 illustrates an example provider network (or "service provider system") environment according to some embodiments. A provider network 2300 may provide resource virtualization to customers via one or more virtualization services 2310 that allow customers to purchase, rent, or otherwise obtain instances 2312 of virtualized resources, including but not limited to computation and storage resources, implemented on devices within the provider network or networks in one or more data centers. Local Internet Protocol (IP) addresses 2316 may be associated with the resource instances 2312; the local IP addresses are the internal network addresses of the resource instances 2312 on the provider network 2300. In some embodiments, the provider network 2300 may also provide public IP addresses 2314 and/or public IP address ranges (e.g., Internet Protocol version 4 (IPv4) or Internet Protocol version 6 (IPv6) addresses) that customers may obtain from the provider 2300.

Conventionally, the provider network 2300, via the virtualization services 2310, may allow a customer of the service provider (e.g., a customer that operates one or more client networks 2350A-2350C including one or more customer device(s) 2352) to dynamically associate at least some public IP addresses 2314 assigned or allocated to the customer with particular resource instances 2312 assigned to the customer. The provider network 2300 may also allow the customer to remap a public IP address 2314, previously mapped to one virtualized computing resource instance 2312 allocated to the customer, to another virtualized computing resource instance 2312 that is also allocated to the customer. Using the virtualized computing resource instances 2312 and public IP addresses 2314 provided by the service provider, a customer of the service provider such as the operator of customer network(s) 2350A-2350C may, for example, implement customer-specific applications and present the customer's applications on an intermediate network 2340, such as the Internet. Other network entities 2320 on the intermediate network 2340 may then generate traffic to a destination public IP address 2314 published by the customer network(s) 2350A-2350C; the traffic is routed to the service provider data center, and at the data center is routed, via a network substrate, to the local IP address 2316 of the virtualized computing resource instance 2312 currently mapped to the destination public IP address 2314. Similarly, response traffic from the virtualized computing resource instance 2312 may be routed via the network substrate back onto the intermediate network 2340 to the source entity 2320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 2300; a customer may then assign their allocated public IP addresses to particular resource instances allocated to the customer. These public IP addresses may be referred to as customer public IP addresses, or simply customer IP addresses. Instead of being assigned by the provider network 2300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 24:
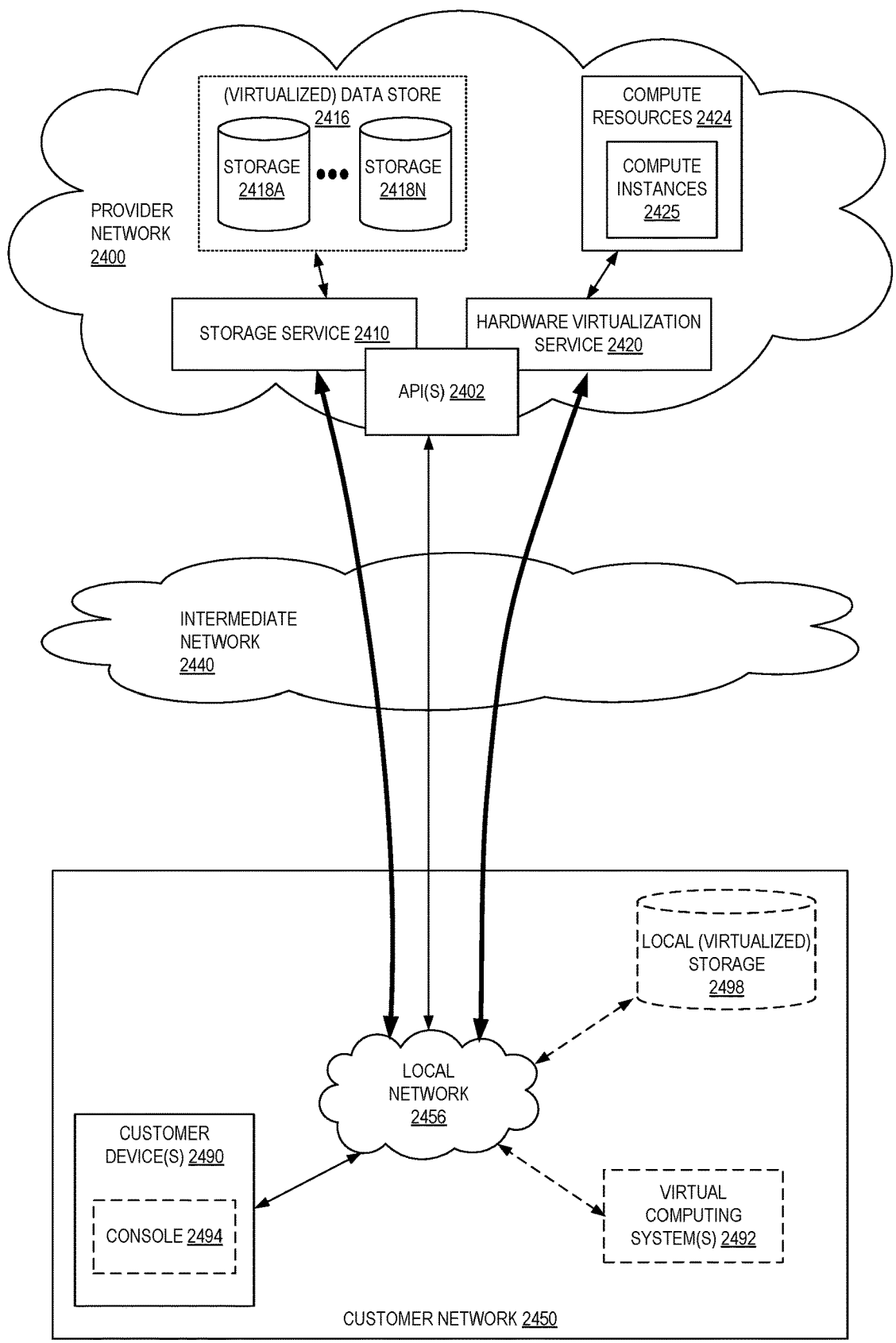
FIG. 24 is a block diagram of an example provider network that provides a storage service and a hardware virtualization service to customers according to some embodiments.

FIG. 24 is a block diagram of an example provider network that provides a storage service and a hardware virtualization service to customers, according to some embodiments. Hardware virtualization service 2420 provides multiple compute resources 2424 (e.g., compute instances 2425 such as VMs) to customers. The compute resources 2424 may, for example, be rented or leased to customers of the provider network 2400 (e.g., to a customer that implements customer network 2450). Each computation resource 2424 may be provided with one or more local IP addresses. Provider network 2400 may be configured to route packets from the local IP addresses of the compute resources 2424 to public Internet destinations, and from public Internet sources to the local IP addresses of compute resources 2424.

Provider network 2400 may provide a customer network 2450, for example coupled to intermediate network 2440 via local network 2456, the ability to implement virtual computing systems 2492 via hardware virtualization service 2420 coupled to intermediate network 2440 and to provider network 2400. In some embodiments, hardware virtualization service 2420 may provide one or more APIs 2402, for example a web services interface, via which a customer network 2450 may access functionality provided by the hardware virtualization service 2420, for example via a console 2494 (e.g., a web-based application, standalone application, mobile application, etc.). In some embodiments, at the provider network 2400, each virtual computing system 2492 at customer network 2450 may correspond to a computation resource 2424 that is leased, rented, or otherwise provided to customer network 2450.

From an instance of a virtual computing system 2492 and/or another customer device 2490 (e.g., via console 2494), the customer may access the functionality of storage service 2410, for example via one or more APIs 2402, to access data from and store data to storage resources 2418A-2418N of a virtual data store 2416 (e.g., a folder or "bucket", a virtualized volume, a database, etc.) provided by the provider network 2400. In some embodiments, a virtualized data store gateway (not shown) may be provided at the customer network 2450 that may locally cache at least some data, for example frequently-accessed or critical data, and that may communicate with storage service 2410 via one or more communications channels to upload new or modified data from a local cache so that the primary store of data (virtualized data store 2416) is maintained. In some embodiments, a user, via a virtual computing system 2492 and/or on another customer device 2490, may mount and access virtual data store 2416 volumes via storage service 2410 acting as a storage virtualization service, and these volumes may appear to the user as local (virtualized) storage 2498.

While not shown in FIG. 24, the virtualization service(s) may also be accessed from resource instances within the provider network 2400 via API(s) 2402. For example, a customer, appliance service provider, or other entity may access a virtualization service from within a respective virtual network on the provider network 2400 via an API 2402 to request allocation of one or more resource instances within the virtual network or within another virtual network.

Illustrative Systems

Figure 25:
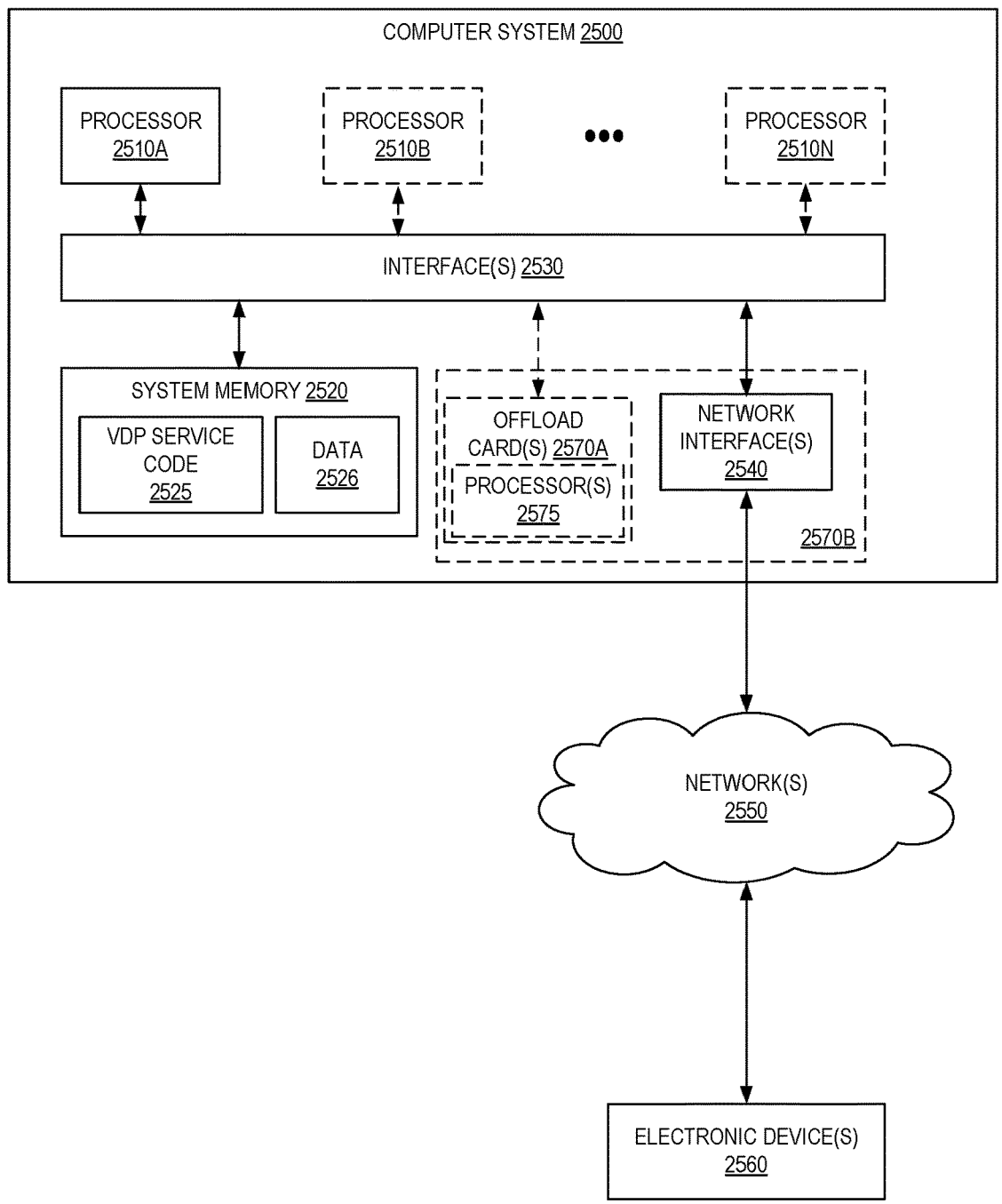
FIG. 25 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 2500 illustrated in FIG. 25. In the illustrated embodiment, computer system 2500 includes one or more processors 2510 coupled to a system memory 2520 via an input/output (I/O) interface 2530. Computer system 2500 further includes a network interface 2540 coupled to I/O interface 2530. While FIG. 25 shows computer system 2500 as a single computing device, in various embodiments a computer system 2500 may include one computing device or any number of computing devices configured to work together as a single computer system 2500.

In various embodiments, computer system 2500 may be a uniprocessor system including one processor 2510, or a multiprocessor system including several processors 2510 (e.g., two, four, eight, or another suitable number). Processors 2510 may be any suitable processors capable of executing instructions. For example, in various embodiments, processors 2510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2510 may commonly, but not necessarily, implement the same ISA.

System memory 2520 may store instructions and data accessible by processor(s) 2510. In various embodiments, system memory 2520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 2520 as VDP service code 2525 (e.g., executable to implement, in whole or in part, the VDP service 102) and data 2526.

In one embodiment, I/O interface 2530 may be configured to coordinate I/O traffic between processor 2510, system memory 2520, and any peripheral devices in the device, including network interface 2540 or other peripheral interfaces. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computer system 2500 and other devices 2560 attached to a network or networks 2550, such as other computer systems or devices as illustrated in FIG. 1, for example. In various embodiments, network interface 2540 may support communication via any suitable wired or wireless general data networks, such as types of Ethernet network, for example. Additionally, network interface 2540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2500 includes one or more offload cards 2570A or 2570B (including one or more processors 2575, and possibly including the one or more network interfaces 2540) that are connected using an I/O interface 2530 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 2500 may act as a host electronic device (e.g., operating as part of a hardware virtualization service) that hosts compute resources such as compute instances, and the one or more offload cards 2570A or 2570B execute a virtualization manager that can manage compute instances that execute on the host electronic device. As an example, in some embodiments the offload card(s) 2570A or 2570B can perform compute instance management operations such as pausing and/or un-pausing compute instances, launching and/or terminating compute instances, performing memory transfer/copying operations, etc. These management operations may, in some embodiments, be performed by the offload card(s) 2570A or 2570B in coordination with a hypervisor (e.g., upon a request from a hypervisor) that is executed by the other processors 2510A-2510N of the computer system 2500. However, in some embodiments the virtualization manager implemented by the offload card(s) 2570A or 2570B can accommodate requests from other entities (e.g., from compute instances themselves), and may not coordinate with (or service) any separate hypervisor.

In some embodiments, system memory 2520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2500 via I/O interface 2530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2500 as system memory 2520 or another type of memory. Further, a computer-accessible medium may include transmission media or signals such as electrical, electromagnetic, or digital signals, conveyed via a communication medium such as a network and/or a wireless link, such as may be implemented via network interface 2540.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 2418A-2418N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a first request to create a source dataset, the first request including an identifier of a dataset stored at a storage location within a service provider network;
    receiving a second request to create a project, the second request including an identifier of the source dataset;
    obtaining a sample dataset from a source dataset, wherein the sample dataset includes less than all of the source dataset;
    generating a first statistical profile of the sample dataset;
    generating a second statistical profile of the source dataset;
    transmitting data to a client device to cause a user interface to present a view of at least some of the sample dataset and summary data based on the first statistical profile;
    transmitting data to the client device to cause the user interface to present a view of summary data based on the second statistical profile;
    receiving a message originated by the client device indicating a request to apply a transformation to the sample dataset;
    applying the transformation to the sample dataset;
    transmitting data to the client device to cause the view of the user interface to be updated to reflect the application of the transformation to the sample dataset;
    updating a recipe object, in a data structure, to include an identifier of the transformation;
    receiving a third request to create a job, the third request including an identifier of another source dataset; and
    executing the job, based on use of the recipe object and the another source dataset, to yield an output dataset.

2. The computer-implemented method of claim 1, wherein the executing of the job occurs responsive to a trigger specified by a user.

3. The computer-implemented method of claim 1, further comprising:
    transmitting data to the client device to cause the user interface to be updated to show an identifier of the output dataset, an identifier of the job, an identifier of the recipe object, and one or more identifiers of one or more transformations associated with the recipe object.

4. A computer-implemented method comprising:
    generating a first statistical profile of a sample taken from a source dataset and a second statistical profile of the source dataset;
    transmitting data to a client device to cause a first user interface provided by the client device to present a view of at least some of the sample dataset and summary data based on the first statistical profile;
    transmitting data to the client device to cause a second user interface provided by the client device to present a view of summary data based on the second statistical profile;
    receiving a message originated by the client device indicating a request to apply a transformation to the sample dataset;
    transmitting data to the client device to cause the view of the first user interface to be updated to reflect an application of the transformation to the sample dataset;
    updating a recipe object, in a data structure, to include an identifier of the transformation; and
    executing a job, based on the recipe object, with the entire source dataset to yield an output dataset.

5. The computer-implemented method of claim 4, further comprising:
    executing a second job, based on the recipe object, with a second source dataset that is different than the source dataset.

6. The computer-implemented method of claim 5, wherein the executing of the second job occurs responsive to a trigger specified by a user.

7. The computer-implemented method of claim 6, wherein the user that specified the trigger is different than another user that provided, owns, or controls the source dataset.

8. The computer-implemented method of claim 5, further comprising:
    identifying the source dataset based on a user-specified value; and
    identifying the second source dataset based on the same user-specified value.

9. The computer-implemented method of claim 4, wherein the summary data based on the first statistical profile includes one or more of:
    an indication, for at least a column of the sample dataset, of data quality of the values of the column; or
    an indication, for at least a column of the sample dataset, of a distribution of the values of the column.

10. The computer-implemented method of claim 4, further comprising:
    transmitting data to the client device to cause the first user interface to be updated to show an identifier of the output dataset, an identifier of the job, an identifier of the recipe object, and one or more identifiers of one or more transformations associated with the recipe object.

11. The computer-implemented method of claim 4, wherein the view provided by the first user interface further includes at least some of a second sample dataset taken from a second source dataset.

12. The computer-implemented method of claim 4, further comprising:
    compressing or encrypting the output dataset to yield a modified output dataset; and
    storing the modified output dataset to an output location.

13. The computer-implemented method of claim 4, further comprising:
    receiving another message originated by the client device indicating a request to create the job, wherein the request includes an identifier of an output location where the output dataset is to be stored; and
    storing the output dataset to the output location.

14. The computer-implemented method of claim 13, wherein the request to create the job further specifies a schedule indicating when the job is to be run, and wherein the method further comprises executing the job a plurality of times according to the schedule.

15. The computer-implemented method of claim 4, further comprising:
    receiving another message originated by another client device indicating a request to create a second job based on the recipe object, wherein the another message includes an identifier of a second source dataset; and executing the second job, based on the recipe object, with the second source dataset to yield a second output dataset.

16. The computer-implemented method of claim 4, wherein:

the source dataset is obtained from a storage service of a service provider network;

the message originated by the client device indicating a request to apply a transformation to the sample dataset is received at a web-service endpoint of the service provider network; and executing the job includes utilizing a cluster of data processing nodes within the service provider network.

17. A system comprising:

a first one or more electronic devices to implement a storage service in a multi-tenant provider network, the storage service to store a source dataset; and a second one or more electronic devices to implement an interactive visual data preparation service in the multi-tenant provider network, the interactive visual data preparation service including instructions that upon execution cause the interactive visual data preparation service to:

obtain a sample dataset from the source dataset, wherein the sample dataset includes less than all of the source dataset;

transmit data to a client device to cause a user interface provided by the client device to present a view of at least some of the sample dataset and summary data based on portions of the sample dataset;

transmit data to the client device to cause the user interface to present a view of summary data based on the entire source dataset;

receive a message originated by the client device indicating a request to apply a transformation to the sample dataset;

transmit data to the client device to cause the view of the user interface to be updated to reflect an application of the transformation to the sample dataset;

update a recipe object, in a data structure, to include an identifier of the transformation; and execute a job, based on the recipe object, with the entire source dataset to yield an output dataset.

18. The system of claim 17, wherein the interactive visual data preparation service further includes instructions that upon execution cause the interactive visual data preparation service to:

execute a second job, based on the recipe object, with a second source dataset that is different than the source dataset.

19. The system of claim 17, wherein the interactive visual data preparation service further includes instructions that upon execution cause the interactive visual data preparation service to:

receive another message originated by the client device indicating a request to create the job, wherein the request includes an identifier of an output location where the output dataset is to be stored, wherein the output location comprises an object storage location provided by the storage service; and store the output dataset to the object storage location.

20. The system of claim 17, wherein the application of the transformation comprises at least one of:

modifying one or more values of a column of the sample dataset;

inserting one or more additional columns of values into the sample dataset based on values of an existing column of the sample dataset; or removing one or more rows of the sample dataset.

* * * * *